US009609546B2

(12) United States Patent
Freeman et al.

(10) Patent No.: US 9,609,546 B2
(45) Date of Patent: Mar. 28, 2017

(54) SYSTEMS AND METHODS FOR ELECTRONIC NEWS GATHERING

(71) Applicant: Accelerated Media Technologies, Inc., Auburn, MA (US)

(72) Inventors: Dudley C. Freeman, Framingham, MA (US); Scott David Blanchard, Strawberry, AZ (US); Andrew George Lillie, Bristol (GB); Ciro Aloisio Noronha, Palo Alto, CA (US); William Anthony Slattery, Los Gatos, CA (US); Thomas P. Jennings, Rutland, MA (US); Steven Paul DeFala, Norwalk, CT (US)

(73) Assignee: Accelerated Media Technologies, Inc., Auburn, MA (US)

( * ) Notice: Subject to any disclaimer, the term of this patent is extended or adjusted under 35 U.S.C. 154(b) by 0 days.

(21) Appl. No.: 15/013,970

(22) Filed: Feb. 2, 2016

(65) Prior Publication Data

US 2016/0227551 A1 Aug. 4, 2016

Related U.S. Application Data

(60) Provisional application No. 62/110,927, filed on Feb. 2, 2015.

(51) Int. Cl.
*H04W 4/00* (2009.01)
*H04W 28/02* (2009.01)
(Continued)

(52) U.S. Cl.
CPC ......... *H04W 28/0289* (2013.01); *H04L 1/004* (2013.01); *H04W 4/06* (2013.01);
(Continued)

(58) Field of Classification Search
CPC ............... H04W 72/085; H04W 12/06; H04W 72/0453; H04W 4/06; H04L 1/004
See application file for complete search history.

(56) References Cited

U.S. PATENT DOCUMENTS 7,359,450 B1 * 4/2008 Payne, III ............. H04L 1/0041
375/286
7,948,933 B2 5/2011 Ohayon et al.
(Continued)

FOREIGN PATENT DOCUMENTS

BR 102012032150 9/2014
WO WO 98/45792 A1 10/1998
(Continued)

OTHER PUBLICATIONS

TV TechCheck (The weekly NAB newsletter for Television Broadcast Engineers, Published by National Association of Broadcasters, Aug. 15, 2011).*
(Continued)

*Primary Examiner* — Clemence Han
(74) *Attorney, Agent, or Firm* — Wolf, Greenfield & Sacks, P.C.

(57) ABSTRACT

A system comprising: at least one network modem configured to communicate wirelessly with at least one base station; and a subsystem configured to provide data packets to the at least one network modem to be transmitted wirelessly to the at least one base station, the subsystem comprising at least one video encoder configured to receive at least one input video signal and provide at least some of the data packets based on the at least one input video signal, wherein: the at least one network modem is further configured to provide network condition information to the subsystem; and the subsystem is further configured to adjust at least one operating parameter of the at least one video
(Continued)

encoder based at least in part on the network condition information received from the at least one network modem.

30 Claims, 12 Drawing Sheets

(51) Int. Cl.
| | | |
|---|---|---|
| H04L 1/00 | (2006.01) | |
| H04W 4/06 | (2009.01) | |
| H04W 12/06 | (2009.01) | |
| H04W 72/04 | (2009.01) | |
| H04W 72/08 | (2009.01) | |

(52) U.S. Cl.
CPC ....... *H04W 12/06* (2013.01); *H04W 28/0252* (2013.01); *H04W 72/0453* (2013.01); *H04W 72/085* (2013.01); *H04L 1/0009* (2013.01)

(56) References Cited

U.S. PATENT DOCUMENTS

| | | |
|---|---|---|
| 8,259,832 B2 | 9/2012 | Feher |
| 8,385,935 B2 | 2/2013 | Shin et al. |
| 8,467,337 B1 | 6/2013 | Ohayon et al. |
| 8,472,461 B2 | 6/2013 | Keon |
| 8,488,659 B2 | 7/2013 | Ohayon et al. |
| 8,488,724 B2 | 7/2013 | Daneshrad et al. |
| 8,498,307 B2 | 7/2013 | Keon |
| 8,571,566 B2 | 10/2013 | Li et al. |
| 8,576,817 B2 | 11/2013 | Stanforth et al. |
| 8,594,061 B2 | 11/2013 | Kennedy et al. |
| 8,649,402 B2 | 2/2014 | Ohayon et al. |
| 8,737,436 B2 | 5/2014 | Ohayon et al. |
| 8,737,501 B2 | 5/2014 | Shah et al. |
| 8,787,966 B2 | 7/2014 | Altman |
| 8,805,358 B2 | 8/2014 | Wang et al. |
| 8,811,292 B2 | 8/2014 | Ohayon et al. |
| 8,831,110 B2 | 9/2014 | Ocon et al. |
| 8,848,697 B2 | 9/2014 | Ohayon et al. |
| 9,510,236 B2 | 11/2016 | Freeman et al. |
| 2002/0168005 A1 | 11/2002 | Collins et al. |
| 2005/0055729 A1 | 3/2005 | Atad et al. |
| 2006/0159016 A1 | 7/2006 | Sagfors et al. |
| 2007/0052406 A1 | 3/2007 | Payne |
| 2007/0204321 A1 | 8/2007 | Shen et al. |
| 2007/0206090 A1 | 9/2007 | Barraud et al. |
| 2007/0274320 A1 | 11/2007 | Joshi et al. |
| 2008/0075031 A1* | 3/2008 | Ohayon ............ H04N 21/2187 370/316 |
| 2008/0089267 A1 | 4/2008 | Zhu et al. |
| 2009/0252134 A1* | 10/2009 | Schlicht .............. H04L 1/0015 370/338 |
| 2009/0310724 A1 | 12/2009 | Shah et al. |
| 2009/0312043 A1 | 12/2009 | Shah et al. |
| 2010/0229210 A1 | 9/2010 | Sharp et al. |
| 2010/0299703 A1 | 11/2010 | Altman |
| 2010/0303182 A1 | 12/2010 | Daneshrad et al. |
| 2010/0312552 A1* | 12/2010 | Zheng .................. H04L 1/0009 704/219 |
| 2010/0329181 A1 | 12/2010 | Lan |
| 2011/0211524 A1 | 9/2011 | Holmes et al. |
| 2011/0276423 A1 | 11/2011 | Davidson |
| 2012/0179947 A1* | 7/2012 | Kato ................. H03M 13/1515 714/746 |
| 2013/0003571 A1* | 1/2013 | Ochiai ................. H04L 1/0014 370/252 |
| 2013/0022131 A1 | 1/2013 | Ocon et al. |
| 2013/0083736 A1 | 4/2013 | Yin et al. |
| 2013/0155231 A1 | 6/2013 | Ohayon et al. |
| 2013/0231126 A1 | 9/2013 | Keon |
| 2013/0238960 A1 | 9/2013 | Shen |
| 2013/0290557 A1 | 10/2013 | Baratz |
| 2013/0336241 A1 | 12/2013 | Keon |
| 2014/0051378 A1 | 2/2014 | Daneshrad et al. |
| 2014/0080532 A1 | 3/2014 | Oh |
| 2014/0241191 A1 | 8/2014 | Yu et al. |
| 2014/0269553 A1 | 9/2014 | Stein et al. |
| 2014/0328401 A1 | 11/2014 | Hegde et al. |
| 2014/0355429 A1 | 12/2014 | Smith et al. |
| 2015/0026542 A1* | 1/2015 | Brennum .............. H04L 65/605 714/776 |
| 2015/0117516 A1* | 4/2015 | Bracha ................... H04N 19/46 375/240.02 |
| 2015/0296224 A1* | 10/2015 | Davis ................... H04N 19/154 375/240.26 |
| 2015/0341646 A1* | 11/2015 | Sze ...................... H04N 19/166 375/240.26 |
| 2015/0373554 A1 | 12/2015 | Freda et al. |
| 2016/0037128 A1* | 2/2016 | Van der Auwera .... H04N 7/147 348/14.13 |
| 2016/0057416 A1* | 2/2016 | Hiriyannaiah ...... G06F 19/3418 375/240.02 |
| 2016/0227432 A1 | 8/2016 | Freeman et al. |
| 2016/0227435 A1 | 8/2016 | Freeman et al. |
| 2016/0227546 A1 | 8/2016 | Freeman et al. |

FOREIGN PATENT DOCUMENTS

| | | |
|---|---|---|
| WO | WO 2012-148075 | 11/2012 |
| WO | WO 2013/025534 A1 | 2/2013 |
| WO | WO 2013-109195 | 7/2013 |
| WO | WO 2013-186663 A1 | 12/2013 |

OTHER PUBLICATIONS

The Electronic News Gathering, www.communications.gov.au/funding_and_programs/The_Electronic_News_Gathering Downloaded Nov. 9, 2014.

Zubrzycki et al.: "Mobile Broadband System, A Report on the Work of RACE Project 2067," BBC Research and Development Report (1996).

"Cellular Transmission Looks to Complement Traditional News Gathering, Not Replace It," TVTechnology; http://www.tvtechnology.com/news-technology/0178/cellular-transmission-looks-to-compl; Oct. 3, 2012.

Pallis et al.: "Electronic News Gathering Via a Wireless Broadband Infrastructure", Downloaded Nov. 9, 2014.

"Gray Hopes to Revolutionize ENG With BAS" TVNewsCheck.com, http://www.tvnewscheck.com/article/67090/gray-hopes-to-revolutionize-eng-with-bas; Downloaded Nov. 9, 2014.

"System Characteristics of Television Outside Broadcast, Electronic News Gathering and Electronic Field Production in the Mobile Service for Use in Sharing Studies," Radiocommunication Study Groups; ITU (International Telecommunication Union) (2007).

Miramar-Garcia, Gabriel: "LiveU debuts news broadcast antennae for LTE delivery" Rapid TV News; http://www.rapidtvnews.com/2013032326931/liveu-debuts-news-broadcast-antennae-for-lte-delivery.html; Mar. 23, 2013.

"Electronics News Gathering—Live Video Delivery" Mushroom Networks; http://www.mushroomnetworks.com/solution/broadcasting ; Nov. 9, 2014.

"SAMBA Broadband Cellular Mobile Services" http://hostria.cet.pt/samba/Index.htm Downloaded Nov. 9, 2014.

Maier, George, Director of Product Marketing Microwave Radio Communications: Whitepaper "The impact of ubiquitous IP connectivity on Electronic News Gathering and Remote Broadcast Infrastructure" Downloaded Nov. 9, 2014.

Berg, Markus et al.: Electronic Newsgathering "Reporter Backpacks—instant and mobile newsgathering from anywhere"; EBU Technical Review 2012 Q3.

"Frontline Communications Partners with TVU Networks to Introduce New Cellular/Microwave/Satellite IP Vehicle Solution" Clearwater, FL—Aug. 5, 2014; Frontline Communications; http://www.tvupack.com/new_version/news/TVU_Press_Release_Frontline.html.

"Press Release"; TVU Networks; http://www.tvupack.com/product_news.html Downloaded Nov. 9, 2014.

(56) References Cited

OTHER PUBLICATIONS

Kovacs, Bob:"Vislink and TVU Bond ENG Paths for Improved Reliability"; Broadcast Engineering Extra, Sep. 12, 2014.
Invitation to Pay Additional Fees for International Application No. PCT/US2016/016218 mailed Mar. 31, 2016.
International Search Report and Written Opinion for Application No. PCT/US2016/016218 mailed Jul. 21, 2016.

* cited by examiner

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

FIG. 9

SYSTEMS AND METHODS FOR ELECTRONIC NEWS GATHERING

RELATED APPLICATION

This application claims the benefit under 35 U.S.C. §119(e) of U.S. Provisional Patent Application No. 62/110,927, filed on Feb. 2, 2015, entitled "SYSTEMS AND METHODS FOR ELECTRONIC NEWS GATHERING," which is incorporated herein by reference in its entirety.

BACKGROUND

To provide coverage of news events (e.g., sporting events, natural disasters, political demonstrations, etc.), broadcast companies send reporters to remote locations where the events are happening. Audio and/or video data captured at the remote locations are transmitted back to TV broadcast/news stations for editing and/or broadcasting.

The broadcast industry uses various technologies for uploading audio and/or video data from remote locations back to TV broadcast/news stations. For example, a news crew may travel in an outside broadcasting (OB) vehicle, which may be equipped with a microwave transmitter for transmitting audio and/or video data to a TV broadcast/news station directly or via one or more relay stations. Alternatively, or additionally, the vehicle may be equipped with a satellite transmitter to transmit the audio and/or video data to the TV broadcast/news station via a communications satellite.

Aside from vehicle-based systems, the broadcast industry uses portable systems that may be carried by a reporter or technician (e.g., a backpack with communication equipment incorporated therein).

Some mobile systems divide traffic amongst multiple network connections (e.g., cellular and/or WiFi connections). Such a system aggregates available bandwidth from multiple communication channels and is sometimes referred to as a "bonded channel" system.

SUMMARY

In some embodiments, a system is provided, comprising: at least one network modem configured to communicate wirelessly with at least one base station; and a subsystem configured to provide data packets to the at least one network modem to be transmitted wirelessly to the at least one base station, the subsystem comprising at least one video encoder configured to receive at least one input video signal and provide at least some of the data packets based on the at least one input video signal, wherein: the at least one network modem is further configured to provide network condition information to the subsystem; and the subsystem is further configured to adjust at least one operating parameter of the at least one video encoder based at least in part on the network condition information received from the at least one network modem.

In some embodiments, a method is provided, comprising acts of: communicating, via at least one network modem, wirelessly with at least one base station; providing data packets to the at least one network modem to be transmitted wirelessly to the at least one base station, wherein at least some of the data packets are provided by at least one video encoder based on at least one input video signal; receiving, from the at least one network modem, network condition information; and adjusting at least one operating parameter of the at least one video encoder based at least in part on the network condition information received from the at least one network modem.

In some embodiments, at least one computer-readable medium is provided, having encoded thereon executable instructions that, when executed by at least one processor, cause the at least one processor to a method comprising acts of: communicating, via at least one network modem, wirelessly with at least one base station; providing data packets to the at least one network modem to be transmitted wirelessly to the at least one base station, wherein at least some of the data packets are provided by at least one video encoder based on at least one input video signal; receiving, from the at least one network modem, network condition information; and adjusting at least one operating parameter of the at least one video encoder based at least in part on the network condition information received from the at least one network modem.

BRIEF DESCRIPTION OF DRAWINGS

FIG.9 shows a table listing illustrative Quality of Service (QoS) characteristics per logical sub-channel, in accordance with some embodiments.

DETAILED DESCRIPTION OF INVENTION

Figure 1:
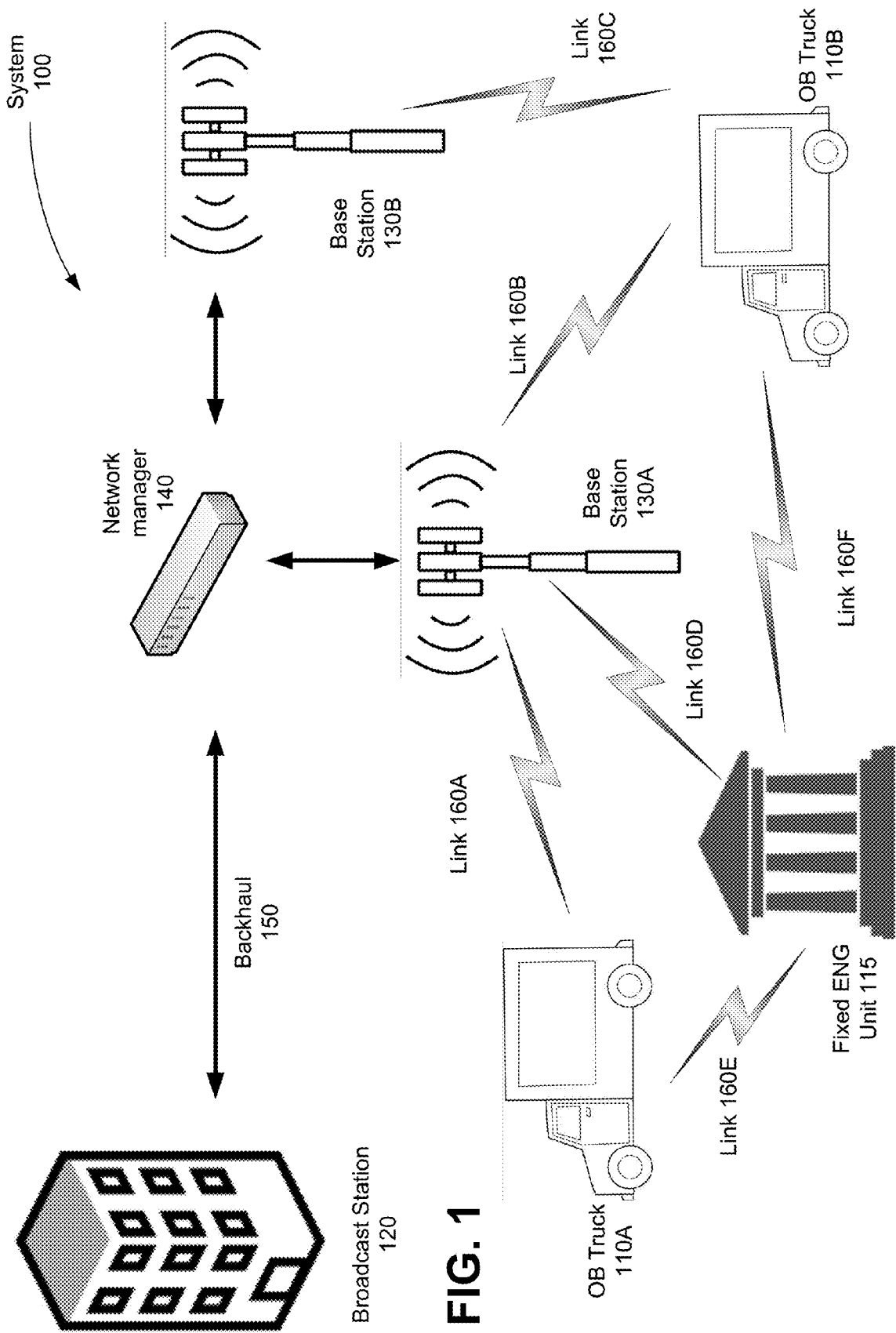
FIG.1 shows an illustrative system 100 in which one or more of the inventive concepts described herein may be implemented, in accordance with some embodiments.

The inventors have recognized and appreciated various disadvantages of conventional systems for uploading audio and/or video data from remote locations back to TV broadcast/news stations. For instance, the inventors have recognized and appreciated that satellite-based systems may be costly to operate because the broadcast companies typically do not own the satellites and therefore must pay ongoing subscription fees to the satellite operators.

Similarly, a bonded channel system may rely on service subscriptions with multiple cellular operators, and there may be ongoing subscription fees. Moreover, the inventors have recognized and appreciated that bonded channel systems may be too unreliable to support high quality video because the broadcast company's traffic must compete with other traffic in the cellular networks. For instance, network congestion tends to occur when and where an important news event is developing because people may attempt to share the news with friends and family using network enabled devices such as smartphones. To obtain a more reliable link, a broadcast company may have to pay additional fees to the cellular operators to have the broadcast company's traffic prioritized. However, reporters for different broadcast companies may be at the same remote location attempting to upload video to the respective stations. If multiple ones of the broadcast companies have paid for prioritized traffic, the video feeds may have equal (albeit high) priority and therefore may compete with each other, resulting in low throughput for each feed. Accordingly, it may be desirable to provide a network in which a particular station (or a particular group of stations) may reliably obtain a certain level of quality of service (QoS) for news gathering traffic.

The inventors have further recognized and appreciated disadvantages of microwave links for transmitting audio and/or video data from OB vehicles to TV broadcast/news stations directly or via one or more relay stations. For example, a microwave link may require a line of sight between a vehicle-side transmitter and a station-side receiver. Furthermore, a microwave link may be unidirectional, so that a separate system must be used for downlink traffic (e.g., audio from the station to the vehicle during an interview of a reporter in the field by a news anchor at the station). Further still, only one OB vehicle may transmit at a time, or there may be signal interference or blocking at the station-side receiver.

Accordingly, in some embodiments, improved systems and methods for electronic news gathering (ENG) are provided. For instance, an ENG network may be provided that operates in a frequency band that broadcast companies are licensed to use with little or no competition from traffic that is unrelated to ENG. The inventors have recognized and appreciated that the Federal Communications Commission (FCC), which regulates radio communications in the US, has traditionally set aside a frequency band for use by broadcast companies. This frequency band, called a "broadcast auxiliary service" (or BAS) band, was located at 1990 MHz to 2110 MHz prior to 2005, but has since been relocated to 2025 MHz to 2496 MHz (hereafter the "2 GHz band") and 6431 MHz to 7119 MHz (hereafter the "7 GHz band"). Illustrative frequency plans for the 2 GHz band and 7 GHz band are shown, respectively, in Tables 1 and 2 below.

Broadcast companies have conventionally used the BAS band for unidirectional microwave transmission from OB vehicles to TV broadcast/news stations. By contrast, in some embodiments, an ENG network may be provided that operates in the BAS band but allows bidirectional communication between an OB vehicle (or a fixed ENG unit) and a TV broadcast/news station, for example, by using a second channel within the BAS band, thus using twice the amount of frequency spectrum.

TABLE 1

Frequency Plan (US), 2 GHz 12 MHz
CHANNEL/FREQUENCY PLAN - CHART NO: 326 2 GHz
(12 MHz)
(Frequency Range 2,025 MHz ? 2,496 MHz)

| Channel | Offset | Receive Frequency MHz |
|---|---|---|
| 1 | ? | 2,028.50 |
| 1 | 0 | 2,031.50 |
| 1 | + | 2,034.50 |
| 2 | ? | 2,040.50 |
| 2 | 0 | 2,043.50 |
| 2 | + | 2,046.50 |
| 3 | ? | 2,052.50 |
| 3 | 0 | 2,055.50 |
| 3 | + | 2,058.50 |
| 4 | ? | 2,064.50 |
| 4 | 0 | 2,067.50 |
| 4 | + | 2,070.50 |
| 5 | ? | 2,076.50 |
| 5 | 0 | 2,079.50 |
| 5 | + | 2,082.50 |
| 6 | ? | 2,088.50 |
| 6 | 0 | 2,091.50 |
| 6 | + | 2,094.50 |
| 7 | ? | 2,100.50 |
| 7 | 0 | 2,103.50 |
| 7 | + | 2,106.50 |
| 8 | ? | 2,454.25 |
| 8 | 0 | 2,458.50 |
| 8 | + | 2,462.75 |
| 9 | ? | 2,471.25 |
| 9 | 0 | 2,475.50 |
| 9 | + | 2,479.75 |
| 10 | ? | 2,488.25 |
| 10 | 0 | 2,492.50 |
| 10 | + | 2,496.75 |

TABLE 2

Frequency Plan (US), 7 GHz
CHANNEL/FREQUENCY PLAN - CHART NO: 326
(Frequency Range 6,431 MHz ? 7,119 MHz)

| Channel | Offset | Receive Frequency MHz |
|---|---|---|
| 1 | ? | 6,881.25 |
| 1 | 0 | 6,887.50 |
| 1 | + | 6,893.75 |
| 2 | ? | 6,906.25 |
| 2 | 0 | 6,912.50 |
| 2 | + | 6,918.75 |
| 3 | ? | 6,931.25 |
| 3 | 0 | 6,937.50 |
| 3 | + | 6,943.75 |
| 4 | ? | 6,956.25 |
| 4 | 0 | 6,962.50 |
| 4 | + | 6,993.75 |
| 5 | ? | 6,981.25 |
| 5 | 0 | 6,987.50 |
| 5 | + | 6,993.75 |
| 6 | ? | 7,006.25 |
| 6 | 0 | 7,012.50 |
| 6 | + | 7,018.75 |
| 7 | ? | 7,031.25 |
| 7 | 0 | 7,037.50 |
| 7 | + | 7,043.75 |
| 8 | ? | 7,056.25 |
| 8 | 0 | 7,062.50 |
| 8 | + | 7,068.75 |
| 9 | ? | 7,081.25 |
| 9 | 0 | 7,087.50 |
| 9 | + | 7,093.75 |
| 10 | ? | 7,106.25 |
| 10 | 0 | 7,112.50 |
| 10 | + | 7,118.75 |
| 11 | ? | 6,431.25 |

TABLE 2-continued

Frequency Plan (US), 7 GHz
CHANNEL/FREQUENCY PLAN - CHART NO: 326
(Frequency Range 6,431 MHz ? 7,119 MHz)

| Channel | Offset | Receive Frequency MHz |
|---|---|---|
| 11 | 0 | 6,437.50 |
| 11 | + | 6,443.75 |
| 12 | ? | 6,456.25 |
| 12 | 0 | 6,462.50 |
| 12 | + | 6,468.75 |
| 13 | ? | 6,481.25 |
| 13 | 0 | 6,487.50 |
| 13 | + | 6,493.75 |
| 14 | ? | 6,506.25 |
| 14 | 0 | 6,512.50 |
| 14 | + | 6,518.75 |

In some embodiments, an ENG network may be based on a wireless networking technology for high-speed data transmission between mobile terminals and base stations. Such a technology may allow multiple mobile terminals to communicate with a base station at the same time. For example, an ENG network may be provided based on a technology that is conventionally used for cellular phones, such as a technology based on a LTE (Long-Term Evolution) standard. However, it should be appreciated that one or more other communication standards may be used in addition to, or instead of, LTE, including, but not limited to, other standards based on GSM (Global System for Mobile Communications), standards based on CDMA (Code Divisional Multiple Access), and/or WiMAX (Worldwide Interoperability for Microwave Access). Furthermore, it should be appreciated that aspects of the present disclosure are not limited to the use of any communication standard at all.

It should also be appreciated that, although an ENG network may be based on a technology conventionally used for cellular phones, the ENG network may, in some embodiments, be implemented with one or more adaptations to provide improved ENG-related capabilities. As one example, in some embodiments, one or more components in an ENG network may be adapted provide bandwidth information for a communication link. For instance, available bandwidth may be estimated based on traffic conditions on the communication link. Additionally, or alternatively, available bandwidth may be estimated based on radio frequency (RF) conditions, where the communication link is a wireless link. In some embodiments, a video encoder may use bandwidth information provided by a network component to adjust one or more parameters used in an encoding operation. For instance, the video encoder may lower an output data rate in response to a decrease in available bandwidth. In this manner, video transmission may be maintained despite low available bandwidth, albeit with lower video quality.

As another example, in some embodiments, multiple mobile ENG units (e.g., OB vehicles) may share bandwidth in an ENG network in a collaborative manner. For instance, the bandwidth demand at each mobile ENG unit may be measured by the video complexity being experienced by an encoder associated with the mobile ENG unit (e.g., more bandwidth may be consumed to transmit higher complexity video). An output data rate may then be assigned to each mobile unit based on overall available bandwidth (which may be variable in a wireless network) and the demands of the different mobile ENG units.

As another example, in some embodiments, bi-directional communication may be provided between a mobile ENG unit and a receiver site, and total bandwidth may be flexibly allocated between the uplink (e.g., from the mobile ENG unit to the transceiver site) and the downlink (e.g., from the transceiver site to the mobile ENG unit). For instance, a switch may be carried out in response to detecting that the uplink is being used to capacity while there is excess capacity on the downlink, or vice versa.

As another example, in some embodiments, mobility management may be provided in an ENG network. For instance, a mobility manager may keep track of which base station and/or frequency channel is being used by which ENG unit, and may update routing data accordingly between one or more TV broadcast/news stations and one or more base stations, so that traffic destined for an ENG unit may be sent to an appropriate base station and/or frequency channel. In some embodiments, a mobility manager may implement one or more authentication protocols, for example, to mutually authenticate an ENG unit and the ENG network.

In some embodiments, an ENG network may serve only, or primarily, ENG-related traffic. For instance, as discussed above, the ENG network may operate in one or more frequency bands that are licensed to broadcast companies and are different from the frequency bands used by cellular operators. In this manner, traffic in the ENG network may be unaffected by congestion in cellular networks. However, it should be appreciated that the various techniques described herein may, alternatively, or additionally, be used for one or more purposes other than ENG. Examples of possible applications include, but are not limited to, military, homeland security, and/or police applications (e.g., airborne applications with one or more helicopters, drones, and/or other types of aircrafts).

It should be appreciated that the concepts introduced above and discussed in greater detail below may be implemented in any of numerous ways, as the disclosed concepts are not limited to any particular manner of implementation. The examples shown in the figures and described herein are provided solely for illustrative purposes.

FIG. 1 shows an illustrative system 100 in which one or more of the inventive concepts described herein may be implemented, in accordance with some embodiments. For instance, the system 100 may be used by a broadcast company to gather news from one or more remote locations.

In some embodiments, the system 100 may include one or more mobile ENG units. For instance, in the example shown in FIG. 1, the system 100 includes two OB vehicles 110A-B that may be deployed to remote locations to cover news events. For example, a news crew may travel in the vehicle 110A to a remote location and capture video and/or audio from a news event. The captured video and/or audio may be uploaded to a broadcast station 120 using communication equipment on the vehicle 110A. The vehicle 110A may also be adapted to receive video and/or audio from the broadcast station 120, such as the audio associated with a news anchor interviewing a reporter in the field. Likewise, the vehicle 110B may be deployed to cover the same or a different event.

It should be appreciated that aspects of the present disclosure are not limited to the use of two mobile ENG units, as fewer or more units may be provided. Furthermore, some of the inventive concepts described herein may be implemented without the use of land vehicles at all. For example, in some embodiments, ENG equipment may be incorporated into other types of vehicles (e.g., boats, helicopters, drones, etc.). Additionally, or alternatively, ENG equipment may be adapted to be carried by a reporter (e.g., incorporated into a backpack or some other suitable carrying case).

Additionally, or alternatively, ENG equipment may be installed at a fixed location (e.g., sports arena, city hall, etc.).

For example, instead of being installed in a vehicle which is parked at a location, ENG equipment may be installed in a building or other type of structure. Such ENG equipment may have any one or more of the capabilities described herein in connection with mobile ENG units. For example, such ENG equipment may be adapted to communicate with base stations and/or mobile ENG units (e.g., serving as a relay for mobile ENG units).

In some embodiments, the vehicles 110A-B may communicate with the broadcast station 120 via an ENG network, which may include one or more transceiver sites. In the example shown in FIG.1, the ENG network includes two transceiver sites where base stations 130A-B are located, respectively. The base stations 130A-B may be adapted to receive data from, and/or send data to, the OB vehicles 110A-B over RF Links 160A-C. For example, the base stations 130A-B may each include equipment (e.g., one or more transceivers) for receiving radio signals from, and/or transmitting radio signals to, the OB vehicles 110A-B. In some embodiments, this equipment may establish separate RF links (e.g. using different antennas and/or different carrier frequencies) 160A and 160B with the OB vehicles 110A and 110B, respectively. Alternatively, or additionally, the vehicles 110A-B may share a common RF Link (e.g., with the same transceiver site antenna and carrier frequency) for simultaneous transmission.

In some embodiments, a base station (e.g., the illustrative base station 130A shown in FIG.1) may be adapted to receive data from, and/or send data to, a fixed ENG unit 115 (e.g., via a link 160D). Additionally, or alternatively, the fixed ENG unit 115 may communicate with the OB vehicles 110A-B via the links 160E-F, respectively.

It should be appreciated that aspects of the present disclosure are not limited to the use of two transceiver sites, as fewer or more transceiver sites may be provided. For instance, in some embodiments, multiple broadcast stations may use the ENG network, and each broadcast station may be associated with one or more transceiver sites that handle that broadcast station's traffic exclusively. However, it should be appreciated that aspects of the present disclosure are not limited to the use of dedicated transceiver sites, as in some embodiments multiple broadcast stations may share a transceiver site. Likewise, in some embodiments, multiple broadcast stations may share a mobile ENG unit. For instance, a mobile ENG unit may be adapted to communicate with a transceiver site of a first broadcast station, as well as a transceiver site of a second broadcast station.

Alternatively, or additionally, a mobile ENG unit may use a communication protocol (e.g., a protocol based on the Internet Protocol, or IP) that allows the mobile ENG unit to indicate which data stream is destined for which broadcast station. In this manner, the mobile ENG unit may transmit multiple data streams to the same transceiver site, and the transceiver site may be adapted to route the data streams to respective destination stations. However, it should be appreciated that even if the ENG network uses an IP-based protocol, the ENG network may not be part of the public Internet and therefore the communication between a mobile ENG unit and a broadcast station may not be affected by traffic conditions in the public Internet.

The inventors have recognized and appreciated that, by using a licensed and/or owned frequency spectrum (e.g., a frequency spectrum in a BAS band), an ENG network may operate as a physical private network. For instance, the ENG network may use a frequency spectrum that is different from frequency spectrums used by public cellular networks (e.g., cellular networks of companies such as Verizon Wireless, AT&T Mobility, T-Mobile, Sprint, etc.). In this manner, performance of the ENG network may be unaffected by traffic conditions in the public cellular networks. By contrast, a solution that relies on a virtual private network may suffer from performance degradation when the underlying public cellular networks become congested.

In some embodiments, an ENG network may include one or more network managers. For instance, in the example shown in FIG.1, the system 100 may include a network manager 140, which may be adapted to perform one or more network management functions, including, but not limited to, packet switching, circuit switching, and/or mobility management. In some embodiments, the network manager 140 may be located at the broadcast station 120. However, that is not required, as in some embodiments the network manager 140 may be located elsewhere, for example, at a transceiver site along with one of the base stations 130A-B.

In some embodiments, the ENG network may be implemented according to an LTE standard. In such an embodiment, the network manager 140 may implement an LTE core network and each of the base stations 130A-B may implement an eNodeB (Evolved Node B). However, it should be appreciated that aspects of the present disclosure are not limited to the use of an LTE network, as other wireless communication technologies may also be suitable, such as other GSM-based technologies (e.g., those developed by the 3rd Generation Partnership Project, or 3GPP), CDMA-based technologies (e.g., those developed by the 3rd Generation Partnership Project 2, or 3GPP2), WiMAX, etc.

It should also be appreciated that any suitable network architecture may be adopted, with network management functionalities distributed in any suitable manner among any suitable combination of network components in addition to, or instead of, the base stations 130A-B and the network manager 140. For instance, in some embodiments, one or more base stations may be adapted to perform one or more network management functionalities, so that a separate network manager may not be needed.

The inventors have recognized and appreciated that, with conventional microwave equipment, only one OB vehicle may transmit at a time, or there may be signal interference or blocking at the receiver. By contrast, in some embodiments, a base station may be adapted to communicate with multiple OB vehicles and/or fixed ENG units at the same time. For example, as illustrated in FIG.1, the base station 130A may be adapted to receive data from, and/or transmit data to, both of the vehicles 110A-B at the same time. This may advantageously allow two or more live feeds to be broadcasted at the same time (e.g., one view from the finish line of a marathon and another view from a location along the marathon route).

The inventors have further recognized and appreciated that a conventional microwave link is unidirectional, so that a separate system must be used for downlink traffic. For example, when an anchor at a TV broadcast/news station interviews a reporter in the field, the video and/or audio of the reporter may be transmitted to the station using microwave equipment, but the audio of the anchor may be transmitted to the reporter using a cellular connection. This may create a delay between the time the anchor asks a question and the time the reporter hears the question. When the delay is significant (e.g., a few seconds), it may become difficult to carry out a conversation.

By contrast, in some embodiments, a bidirectional communication link may be provided between an OB vehicle (or a fixed ENG unit) and a base station, for example, using time division duplexing or frequency division duplexing. In some embodiments, full duplex may be provided, so that uninterrupted video may be transmitted during an interview. However, that is not required, as half duplex may be used in some embodiments.

Furthermore, in some embodiments, an OB vehicle or fixed ENG unit may be adapted to receive data from, and/or transmit data to, another OB vehicle or fixed ENG unit. Such communication may take place in addition to, or instead of, communication with a base station. For example, in some embodiments, the vehicle 110A may have an omnidirectional antenna, which may be used for communication with the vehicle 110B. The inventors have recognized and appreciated that an omnidirectional antenna may advantageously allow one ENG unit (e.g., the vehicle 110A) to transmit data to another ENG unit (e.g., the vehicle 110B) without the antenna being pointed to the other ENG unit (e.g., when one or both of the vehicles are moving). Although omnidirectional antenna may provide a lower data rate compared to a directional antenna, the lower data rate may be sufficient to support one or more capabilities such as text messaging, voice, network status reporting, remote command and/or control, etc. However, it should be appreciated that aspects of the present disclosure are not limited to the use of an omnidirectional antenna for vehicle-to-vehicle communication, or to having any vehicle-to-vehicle communication at all.

In some embodiments, vehicle-to-vehicle communication may be multicast (using, for example, IP multicast addressing) or unicast (using, for example, IP unicast addressing). For example, data packets may be sent from one ENG unit to a base station using IP multicast addressing, and the base station may forward the packets to multiple other ENG units. The inventors have recognized and appreciated that the use of multicast may allow for efficient one-to-many communications (as opposed to sending multiple copies of the same information using unicast channels). For instance, in a multiple-vehicle scenario, the use of multicast may allow each vehicle to monitor a signal from every other vehicle. However, it should be appreciated that aspects of the present disclosure are not limited to the use of multicast communication.

In some embodiments, the vehicle 110B may travel from an area (also referred to as a "cell") served by the base station 130B to an area served by the base station 130A. The signal quality between the vehicle 110B and the base station 130B may deteriorate, while the signal quality between the vehicle 110B and the base station 130A may improve. The network manager 140 may manage the handover of one or more communication sessions of the vehicle 110B from the base station 130A to the base station 130B. In this manner, a live video feed to the broadcast station 120 may be maintained while the vehicle 110B is moving (e.g., covering a marathon, police car chase, etc.). The inventors have recognized and appreciated that such mobile coverage represents a significant advantage over conventional microwave equipment, which may require a line of sight between the OB vehicle and the microwave station but the line of sight may be lost when the OB vehicle moves.

In some embodiments, a backhaul link 150 may be provided between the network manager 140 and the broadcast station 120. Any suitable combination of infrastructures may be used to provide the backhaul link 150, including, but not limited to, copper wire, optical fiber, microwave, and/or satellite. Furthermore, any suitable communication protocol may be used. For example, in some embodiments, the network manager 140 and the broadcast station may be connected to the same LAN (local area network) and the backhaul link 150 may include a connection using any suitable LAN technology, such as Ethernet and/or WiFi.

As discussed above, the system 100 may, in some embodiments, include multiple broadcast stations (although only one, the broadcast station 120, is shown in FIG.1). The broadcast stations may communicate with each other, for example, to share news information and/or other resources. A communication link between two broadcast stations may be provided in any suitable manner, for example, via a LAN and/or over the public Internet.

It should be appreciated that the various components of the system 100 shown in FIG.1 and described above are merely illustrative. The inventive concepts disclosed herein may be implemented in any suitable manner using any suitable device or combination of devices. For instance, although FIG.1 shows one network manager and two base stations managed by the network manager, it should be appreciated that an ENG network may include any suitable number of one or more network managers, each with any suitable number of one or more managed base stations. Furthermore, although the network manager 140 is shown in FIG.1 as a discrete unit, the network manager 140 may in some embodiments be incorporated into another piece of equipment, such as one of the base stations 130A-B.

Figure 2:
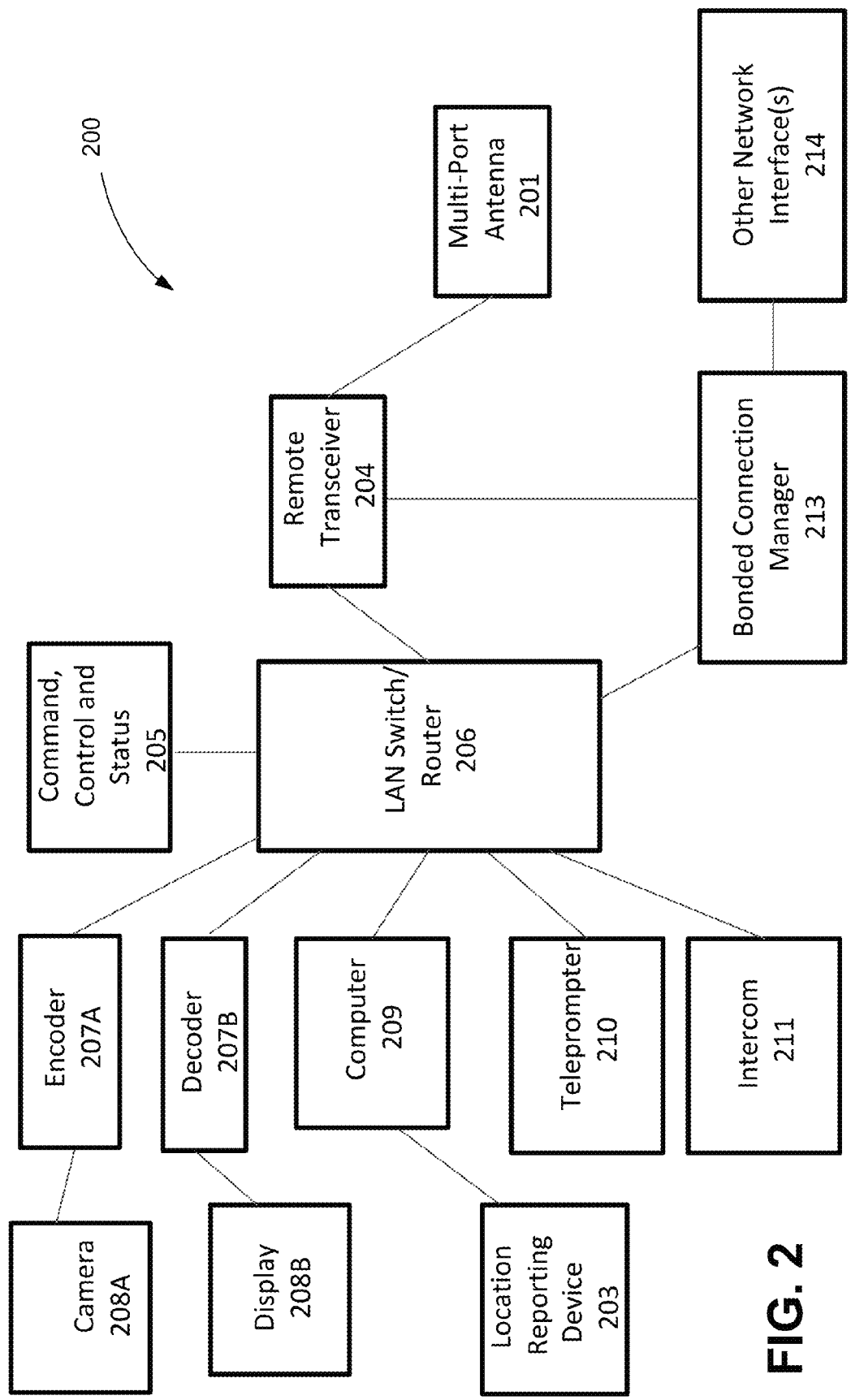
FIG.2 shows an illustrative system 200 that may be installed on a mobile or fixed unit, in accordance with some embodiments.

FIG.2 shows an illustrative system 200 that may be installed on a mobile ENG unit, in accordance with some embodiments. For example, the system 200 may be installed on one or both of the illustrative OB vehicles 110A-B shown in FIG.1 to provide ENG-related capabilities. Additionally, or alternatively, the system 200 may be installed on the illustrative fixed ENG unit 115 shown in FIG.1.

In the example shown in FIG.2, the system 200 includes a multi-port antenna 201, which may be coupled to a remote transceiver 204. The multi-port antenna 201 and remote transceiver 204 may be adapted to transmit and/or receive signals (e.g., in a BAS frequency band) to provide communication between the mobile ENG unit and a broadcast station. For example, the multi-port antenna 201 may be a directional antenna, such as a parabolic dish antenna with two or more selectable or simultaneous polarizations. However, aspects of the present disclosure are not limited to the use of an antenna with multiple polarizations, as in some embodiments an antenna with single polarization may be used additionally or alternatively.

In some embodiments, the system 200 may include an omnidirectional antenna, in addition to, or instead of, a directional antenna. The inventors have recognized and appreciated that although a directional antenna may provide better performance (e.g., increased transmission range and/or reduced signal inference), a directional antenna may not be suitable in all situations. As one example, when an OB vehicle is moving, it may be difficult to ensure that a directional antenna is always pointed toward a desired transceiver site. As another example, when an OB vehicle arrives at a scene, it may take a technician some time (e.g., a few minutes) to set up a directional antenna to point toward a desired transceiver site. Such a delay may be significant when a news story is rapidly unfolding. For these and/or other reasons, it may be desirable to have an omnidirectional antenna in addition to, or instead of, a directional antenna.

In some embodiments, the remote transceiver 204 may be coupled to one or more devices on the ENG mobile unit. For example, the remote transceiver 204 may receive data from a device on the ENG mobile unit and may transmit the received data via an antenna to a transceiver site. Alternatively, or additionally, the remote transceiver 204 may receive data from a transceiver site via an antenna, and may forward the received data to a device on the ENG mobile unit.

In some embodiments, the remote transceiver 204 may be coupled to one or more devices on the ENG mobile unit via a network connection device. For instance, in the example shown in FIG.2, the remote transceiver 204 may be coupled to one or more devices on the ENG mobile unit via a LAN switch or router 206. Any suitable LAN technology may be used. For example, the LAN may be wired (e.g., Ethernet) or wireless (e.g., WiFi).

Moreover, the remote transceiver 204 may be coupled to any suitable device. In one example, the ENG mobile unit may include a camera 208A, which may be adapted to provide a high definition (HD), standard definition (SD), and/or any other suitable video signal to a video encoder unit (also referred to as a video compressor). For instance, in the example shown in FIG.2, the camera 208A may provide a video signal to a video encoder 207A, which may be adapted to process the video signal to generate a video-over-IP data stream, and to output the data stream to the remote transceiver 204 via the LAN switch/router 206. Additionally, or alternatively, one or more video-over-IP data streams (e.g., video of a news anchor speaking at a broadcast station studio and/or video feed from another location) may be received via the LAN switch/router 206 and provided to a video decoder 207B for decoding. The decoded video may be displayed to a reporter or other member of a news crew in the field, for example, on a screen of the computer 209 or other display device, such as a display device 208B.

In some embodiments, a video-over-IP data stream generated by an encoder may have a standard format, so that the data stream may be decoded by any decoder configured to process data streams having that standard format. In this manner, encoding equipment and decoding equipment made by different manufacturers may be interoperable. However, aspects of the present disclosure are not limited to the use of standard formats, as in some embodiments proprietary formats may be used.

In some embodiments, the camera 208A may be adapted to provide to the video encoder 207A both an audio signal and a video signal. For example, the camera 208A may include an on-board microphone for capturing audio. Alternatively, or additionally, a separate microphone (not shown) may be used to capture audio and a resulting audio signal may be provided to the video encoder 207A. In either case, the video encoder 207A may be adapted to process the input audio and video signals into a multimedia data stream for transmission. However, it should be appreciated that aspects of the present disclosure are not limited to the combination of audio and video information into a single data stream, as in some embodiments audio and video may be separately transmitted.

As discussed in detail below, the video encoder 207A may be adapted to adjust one or more parameters used in an encoding operation based on one or more operating conditions (e.g., air link quality, network traffic, characteristics of the input video signal, etc.). For example, the video encoder 207A may be adapted to detect whether available bandwidth has dropped (e.g., due to poor air link quality and/or heavy traffic) and if so, lower an output data rate (e.g., by increasing a compression rate). The inventors have recognized and appreciated that by monitoring available bandwidth and lowering data rate accordingly at each mobile ENG unit, overall network congestion may be reduced and each mobile ENG unit may be able to maintain transmission of a video-over-IP data stream (albeit with lowered video quality).

However, it should be appreciated that aspects of the present disclosure are not limited to the use of a smart video encoder, as in some embodiments a video encoder may operate without adjusting encoding parameters.

Also, it should be appreciated that any suitable video compression method may be used by a video encoder, as aspects of the present disclosure are not so limited. Examples of video compression methods include, but are not limited to, MPEG-2 Video, MPEG-4 Video, MPEG-4 AVC (Advanced Video Encoding), HEVC (High Efficiency Video Encoding), etc.

In some embodiments, one or more other devices may be coupled to the LAN switch/router 206, in addition to, or instead of, the camera 208A and the video encoder 207A. For instance, in the example shown in FIG.2, the system 200 may include a general-purpose computer 209, on which one or more applications may be running. Examples of applications include, but are not limited to, email, file transfer, chat, web browsing, voice-over-IP (VoIP), virtual private network (VPN), etc. These applications may transmit and/or receive data (e.g., in the form of network packets such as IP packets) via the LAN switch/router 206 and the remote transceiver 204. In some embodiments, data may be transmitted to a destination, or received from a source, that is coupled to the same ENG network as the system 200. For example, the destination or source may be a broadcast station (e.g., the illustrative broadcast station 120 shown in FIG.1) on the ENG network. Alternatively, or additionally, the destination or source may be outside the ENG network, and the communication path may include a portion of the public Internet.

In some embodiments, a mobile ENG unit may include one or more devices adapted to provide ENG-related capabilities. For instance, in the example shown in FIG.2, the system 200 includes a teleprompter 210, which may be connected to a broadcast station (e.g., the illustrative broadcast station 120 shown in FIG.1) via the LAN switch/router 206 and the remote transceiver 204. The teleprompter 210 may be adapted to receive information (e.g., text to be read) from the broadcast station and to display the information to a reporter or another person on camera.

In some embodiments, the system 200 may include an intercom 211. Like the teleprompter 210, the intercom 211 may be connected to a broadcast station (e.g., the illustrative broadcast station 120 shown in FIG.1) via the LAN switch/router 206 and the remote transceiver 204, and may be adapted to allow voice communication between a news crew in the field and broadcast station staff (e.g., using a VoIP protocol). In some embodiments, this voice communication may be separate from audio processed by the encoder 207A or the decoder 207B.

The inventors have recognized and appreciated that voice communication capability separate from communication of news footage may facilitate collaboration between a news crew in the field and broadcast station staff. However, aspects of the present disclosure are not limited to providing a separate voice communication capability.

In some embodiments, the system 200 may include a location reporting device 203, which may be a standalone device, or may be integrated into another component of the system 200. The location reporting device 203 may be adapted to provide location and/or time information to any device (or combination of devices) in the system 200. For example, the location reporting device 203 may be a GPS (Global Positioning System) receiver and may be adapted to distribute location and/or time information to a general purpose computer (e.g., the computer 209) or other device in any suitable way, including, but not limited to, by providing a 1 PPS (Pulse Per Second) signal to a communication port of the computer (e.g., an RS-232 serial port).

Additionally, or alternatively, the location and/or time information may be provided to a broadcast station (e.g., the illustrative broadcast station 120 shown in FIG.1) via the LAN switch/router 206 and the remote transceiver 204. Such an update may be provided periodically, for example, with a period chosen to provide up-to-date information to the broadcast station without overburdening the communication link between the mobile ENG unit and the broadcast station. For instance, in some embodiments, a location and/or time update may be provided to the broadcast station every 30 seconds, one minute, two minutes, etc.

A broadcast station may use the location and/or time information received from a mobile ENG unit in any suitable manner. For instance, in some embodiments, a management system may present the location and/or time information to a user (e.g., with a map overlay). This may allow the user to readily track the movement of the mobile ENG unit and/or the relative locations of multiple mobile ENG units. Additionally, or alternatively, the location and/or time information may be logged into a suitable database for later use.

In some embodiments, the location reporting device 203 may provide the location and/or time information to the video encoder 207A of the system 200, in addition to, or instead of, providing the location and/or time information to the broadcast station. The encoder 207A may insert the location and/or time information into a compressed video stream produced by the encoder 207A. In this manner, the location and/or time information may be later identified without having to access any resource other than a compressed video file (e.g., without having to look up the location and/or time information from a database).

Below are non-limiting examples of information that may be used to tag the content in a data stream produced by the encoder 207A. It should be appreciated that any suitable combination of one or more pieces of location and/or time information may be inserted in any suitable format, as aspects of the present disclosure are not so limited.

- A mobile ENG unit identifier may be provided, for example, in a Service Name field in a Service Description Table (SDT) (e.g., as specified in a digital video broadcasting standard such as ETSI EN 300 468).
- A current time may be stored in a Time and Date Table (TDT) (e.g., as specified in a digital video broadcasting standard such as ETSI EN 300 468).
- A mobile ENG unit location (e.g., in the form of GPS coordinates) may be recorded using a private descriptor in a descriptor loop of an SDT. In some embodiments, the private descriptor may be user defined, for example, according to ETSI EN 300 468 Table 12, using a descriptor tag between 0x80 and 0xFE. In some embodiments, the location information may be recorded in a coded form. For example, raw GPS position data may be directly entered in a descriptor payload.

In some embodiments, the system 200 may include a command, control, and status component 205 shown in FIG.2. The command, control, and status component 205 may be connected to the LAN switch/router 206, for example, to receive status information from one or more components of the system 200 and/or send one or more commands to such components. Additionally, or alternatively, the command, control, and status component 205 may be connected to a broadcast station (e.g., the illustrative broadcast station 120 shown in FIG.1) via the LAN switch/ router 206 and the remote transceiver 204, for example, to receive status information from one or more components at the broadcast station and/or send one or more commands to such components. The command, control, and status component 205 may be adapted to display the received status information to a user (e.g., via a graphical user interface). Additionally, or alternatively, the command, control, and status component 205 may be adapted to present an interface to allow the user to configure or otherwise issue a command to one or more components connected to the command, control, and status component 205 (e.g., one or more components of the mobile ENG unit and/or one or more components located at the broadcast station). For instance, the command, control, and status component 205 may be adapted to process input received from the user to generate one or more command messages to be sent to an appropriate recipient component via the LAN switch/router 206.

Although the command, control, and status component 205 is shown in FIG.2 as a separate component, it should be appreciated that aspects of the present disclosure are not so limited. For example, in some embodiments, one or more of the functionalities of the command, control, and status component 205 may be performed by a software application running on a device on the mobile ENG unit, such as the computer 209.

The inventors have recognized and appreciated that capabilities such as video and/or audio compression, teleprompting, intercom, location reporting, and/or remote command, control, and status monitoring may facilitate news reporting, for example, by providing a range of tools to a news crew in the field that were previously available only in a news studio, and/or by allowing studio staff to remotely monitor and/or manage operation of a mobile ENG unit. However, it should be appreciated that aspects of the present disclosure are not limited to the use of any particular one or combination of these capabilities. Furthermore, it should be appreciated that a mobile ENG unit may include one or more other components in addition to, or instead of, those discussed above. As one example, the system 200 may include a storage server (e.g., a network-attached storage, or NAS), which may be connected to the LAN switch/router 206. As another example, as shown in FIG.2, the system 200 may include one or more network interfaces 214 for connecting to one or more other communication networks, for example, via the LAN switch/router 206. Examples of other communication networks include, but are not limited to, satellite, DSL, cable, Ethernet, fiber optic, WiFi, and/or public cellular networks.

In some embodiments, the system 200 may include a bonded connection manager configured to aggregate bandwidth from multiple networks to emulate a single data pipe. For instance, in the example shown in FIG.2, a bonded connection manager 213 may be used to emulate a single data pipe using the remote transceiver 204 and/or one or more of the other network interfaces 214. The bonded connection manager 213 may be configured to select a network interface for a communication session and monitor the session for problems such as loss of connection and/or excessive delays. When a problem is detected, the bonded connection manager 213 may be configured to handle a failover to another network interface. The failover may be transparent to the communication session, so as to provide a seamless user experience.

Although the inventors have recognized and appreciated that a bonded connection manager may be used to improve user experience, it should be appreciated that aspects of the present disclosure are not limited to the use of a bonded connection manager. In some embodiments, the remote transceiver 204 and/or one or more of the other network interfaces 214 may be connected to the LAN switch/router 206 directly, in addition to, or instead of, via the bonded connection manager 213. For instance, the remote transceiver 204 may be connected to the LAN switch/router 206 to provide information regarding current network conditions to one or more other devices on the mobile ENG unit, such as the encoder 207A.

The inventors have further recognized and appreciated that, for some news gathering operations, it may be desirable for a reporter to operate without being noticed as a member of the media. Accordingly, in some embodiments, a portable interface module is provided. The portable interface module may be configured to receive a data stream from a camera and transmit the data stream either directly to a transceiver site, or via a nearby mobile unit.

In some embodiments, a pseudo wire connection may be established between a portable interface module and a network device (e.g., switch or router) at a transceiver site or mobile unit. For example, a Layer 2 Tunneling Protocol Version 3 (L2TPv3) protocol may be used to encapsulate traffic between the portable interface module and the network device.

Figure 11:
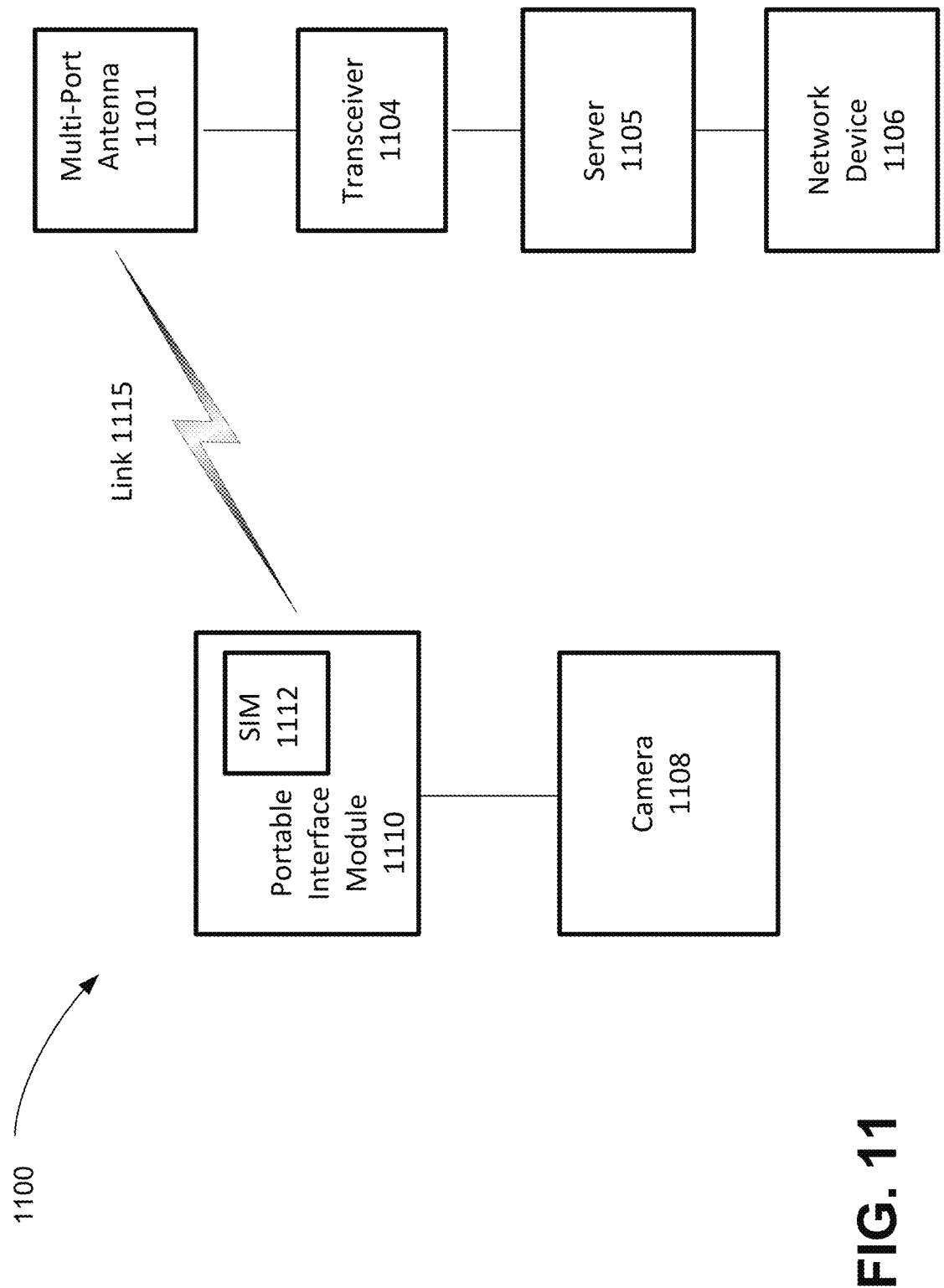
FIG.11 shows an illustrative system 1100 having a portable interface module, in accordance with some embodiments.

FIG. 11 shows an illustrative system 1100 having a portable interface module, in accordance with some embodiments. In this example, the system 1100 includes a multi-port antenna 1101, a transceiver 1104, a server 1105, and a network device 1106, which may be equipment installed on an ENG unit (e.g., the illustrative OB vehicle 110A or 110B or fixed ENG unit 115 shown in FIG. 1), or at a transceiver site (e.g., the illustrative base station 130A or 130B shown in FIG. 1). The system 1100 may further include a camera 1108 and a portable interface module 1110 connected to the camera 1108.

In some embodiments, the camera 1108 may include an encoder (not shown) configured to process a video signal into a stream of data packets to be transmitted by the portable interface module 1110. Any suitable connector may be used between the camera 1108 and the portable interface module 1110. As one example, the portable interface module 1110 may be configured as a USB (Universal Serial Bus) stick. As another example, the portable interface module 1110 may be configured as a mini PCI (Peripheral Component Interconnect) card. However, it should be appreciated that aspects of the present disclosure are not limited to the use of any particular connector, or any connector at all. In some embodiments, features of the portable interface module 1110 may be integrated into the camera 1108.

In some embodiments, a maximum ratio combining technique may be used to improve quality of signals received at the receiver site or mobile unit. For example, more receivers (e.g., four) may be used at the receiver site or mobile unit than transmitters (e.g., two). In this manner, adequate signal quality may be achieved while keeping power consumption low at the portable interface module 1110. However, it should be appreciated that aspects of the present disclosure are not limited to the use of any maximum ratio combining technique.

In some embodiments, the portable interface module 1110 may include a SIM (Subscriber Identity Module) 1112, which may be used by the transceiver 1104 to authenticate the portable interface module 1110. Unlike a mobile phone SIM, which stores a phone number, the SIM 1112 may store an identifier that associates the SIM 1112 with the network device 1106. The portable interface module 1110 may be configured to encapsulate a data packet received from the camera 1108 into a payload of an outer packet. The outer packet may be labeled with the identifier stored in the SIM 1112, and the server 1105 at the transceiver site or mobile unit may be configured to match the label to the network device 1106 and provide the decapsulated inner packet to the network device 1106.

The inventors have recognized and appreciated that a pseudo wire connection may simplify operations of a device used in the field, such as a camera. Moreover, a pseudo wire connection may allow a person or a computer at a broadcast station to remotely control a field device such as a camera. However, it should be appreciated that aspects of the present disclosure are not limited to the use of a pseudo wire connection between a portable interface module and a network device.

Figure 3:
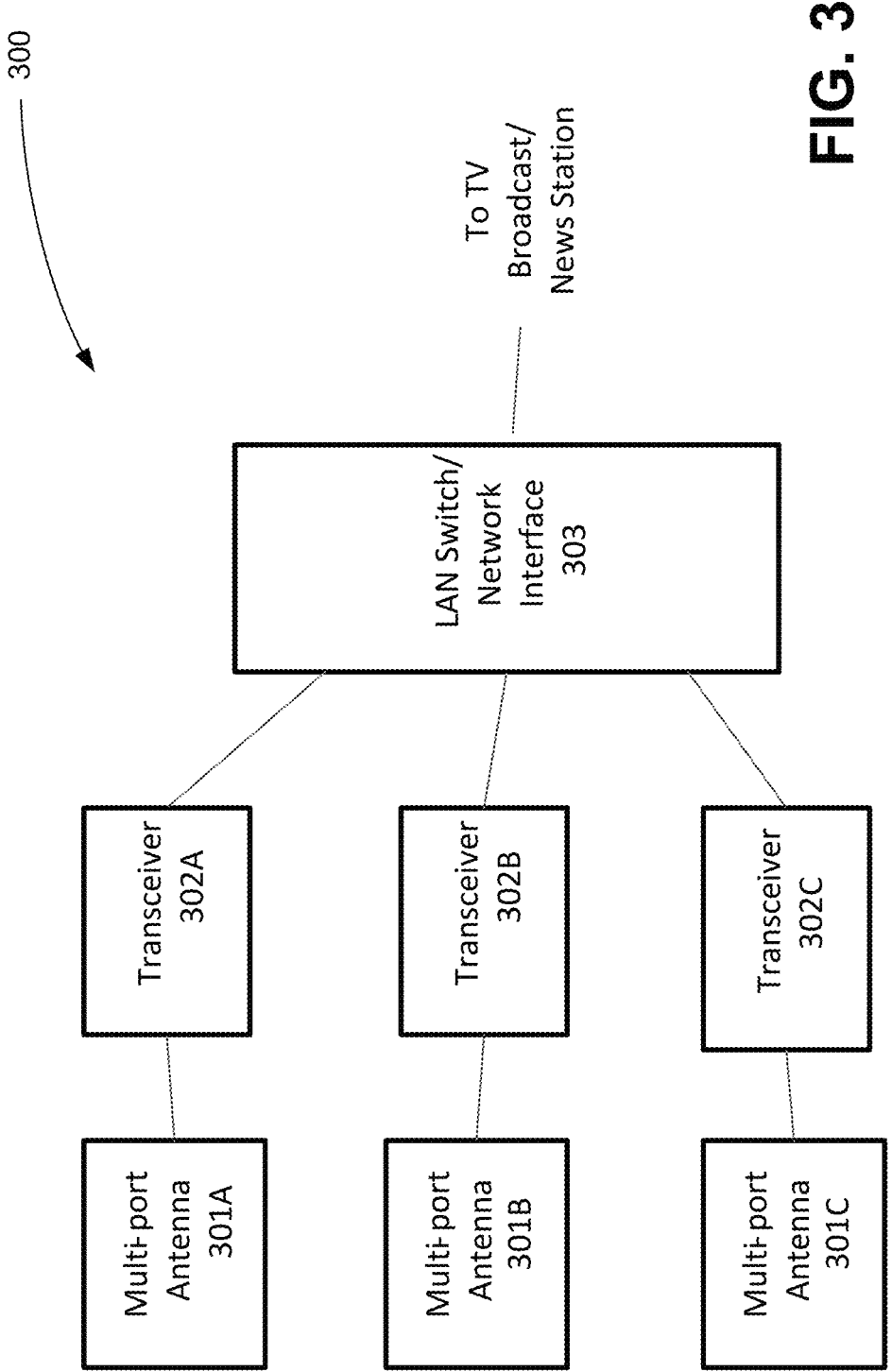
FIG.3 shows an illustrative system 300 that may be used at a transceiver site, in accordance with some embodiments.

FIG. 3 shows an illustrative system 300 that may be used at a transceiver site, in accordance with some embodiments. For example, one or both of the illustrative base stations 130A-B shown in FIG. 1 may include the system 300.

In some embodiments, the system 300 may include one or more antennas. For instance, in the example shown in FIG. 3, the system 300 includes three antennas 301A-C, which may be coupled, respectively, to transceivers 302A-C. The antennas 301A-C and transceivers 302A-C may be adapted to transmit and/or receive signals (e.g., in a BAS frequency band) to provide communication between one or more mobile ENG units and a broadcast station. For example, in some embodiments, each antenna and transceiver combination may serve a 120-degree sector, and may communicate with a different mobile ENG unit. Additionally, or alternatively, multiple mobile ENG units may be present in the same sector and may communicate with the antenna and transceiver combination at the same time. For example, the antenna and transceiver combination may be adapted to allow multiple mobile ENG units to share available bandwidth. However, it should be appreciated that aspects of the present disclosure are not limited to the use of three antenna and transceiver combinations, as in some embodiments fewer or more antenna and transceiver combinations may be used (e.g., one, two, four, five, etc.). Furthermore, aspects of the present disclosure are not limited to the use of one antenna for each transceiver, as in some embodiments more antennas (e.g., two, three, four etc.) may be coupled to a transceiver.

In some embodiments, one or more of the antennas 301A-C may be multi-port antennas. For example, the antennas 301A-C may include a mechanically steerable parabolic dish antenna with one or more polarizations. Alternatively, or additionally, the antennas 301A-C may include a MIMO (multiple-input, multiple-output) antenna, such as a 2×4 MIMO antenna that enables transmission over two polarizations, and four receptions on two polarizations from two spatially separated elements. In some embodiments, a multi-port antenna may be realized with several single port, single polarization elements. Alternatively, or additionally, a multi-port antenna may be provided as an integrated unit.

The inventors have recognized and appreciated that multi-port antennas may provide better performance (e.g., increased link capacity) than single-port antennas. For example, in some embodiments, multiple orthogonal polarizations may be used to allow simultaneous operation of multiple ENG units (e.g., with a first polarization assigned to one mobile ENG unit and a second polarization, which is orthogonal to the first polarization, assigned to a different mobile ENG unit). Any suitable combination of orthogonal polarizations may be used, including, but not limited to:

Right Hand and Left Hand Circular; Horizontal and Vertical; and/or Slant Right and Slant Left linear polarizations. However, it should be appreciated that aspects of the present disclosure are not limited to the use of multi-port antennas, as in some embodiments single-port antennas may be used.

In some embodiments, one or more multi-port antennas may be used at a mobile ENG unit. For instance, in the example shown in FIG.2, the antenna 201 may be a multi-port antenna adapted to provide two orthogonal polarizations to the remote transceiver 204. In some embodiments, one or more combining techniques (e.g., maximum ratio combining) to combine the signals from the orthogonal polarizations, for example, to obtain an enhanced signal-to-noise ratio. Additionally, or alternatively, the remote transceiver 204 may be adapted to dynamically adjust in response to one or more changes in either or both of the orthogonal polarizations. For example, the remote transceiver 204 may be adapted to detect a change in signal strength and/or phase of a signal received from one or both of the two polarizations. In response to detecting such a change, the remote transceiver 204 may adjust an amplitude and/or phase of a combining matrix to improve a signal-to-noise ratio (e.g. by adjusting one or more maximum ratio combining coefficients).

In some embodiments, space-time encoding may be carried out using multiple polarizations (e.g., by transmitting the same data stream via two orthogonal polarizations). The inventors have recognized and appreciated that the use of space-time encoding may advantageously make more bandwidth available to a mobile ENG unit. However, it should be appreciated that aspects of the present disclosure is not limited to the use of space-time encoding. In some embodiments, the system 300 may include a LAN switch/network interface 303, which may be adapted to combine data from one or more transceivers (e.g., the transceivers 302A-C) for routing to a TV broadcast/news station.

Figure 4:
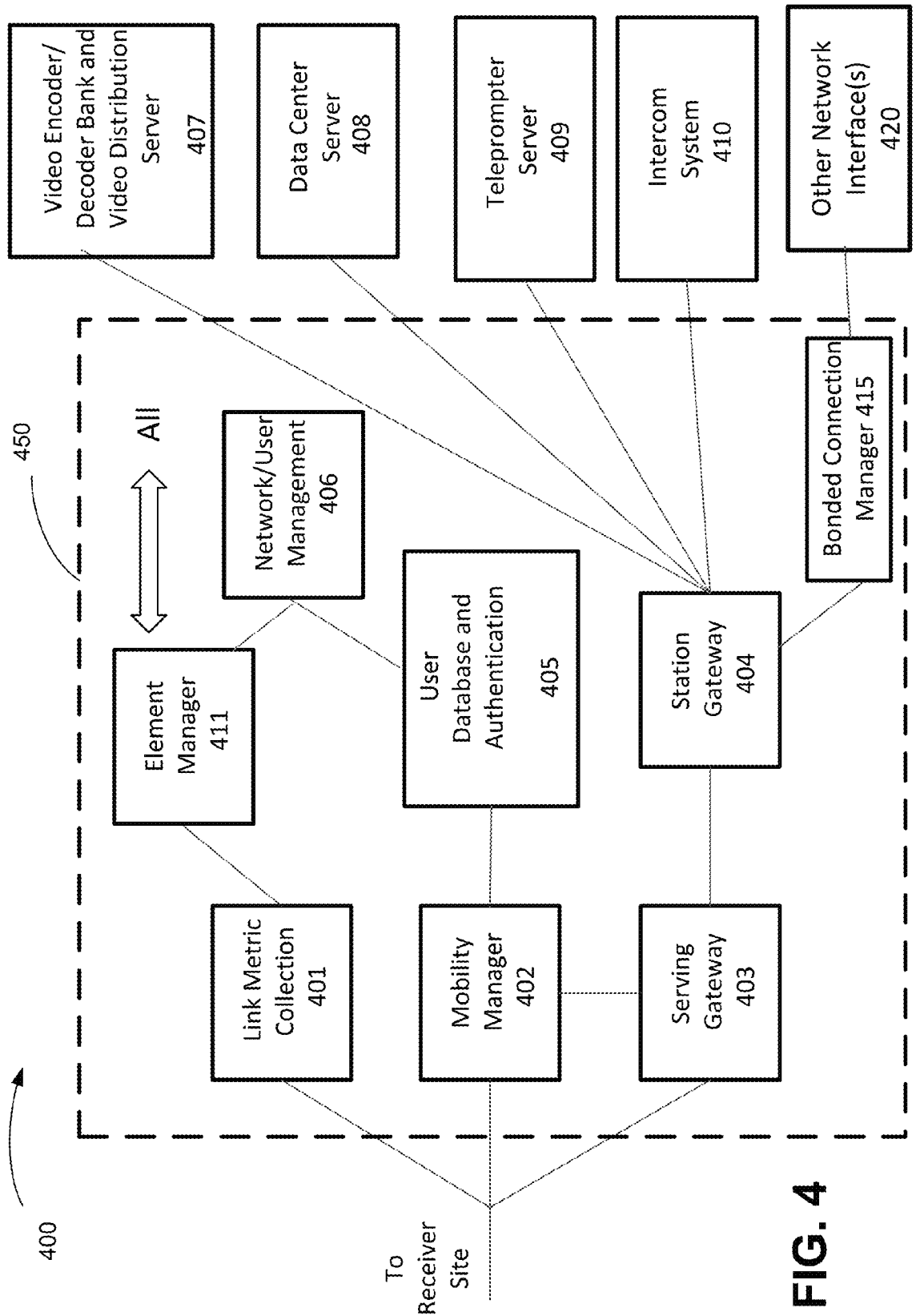
FIG.4 shows an illustrative system 400 that may be installed at a broadcast station, in accordance with some embodiments.

FIG.4 shows an illustrative system 400 that may be installed at a broadcast station, in accordance with some embodiments. For example, the system 400 may be installed at the illustrative broadcast station 120 shown in FIG.1 to provide ENG-related capabilities.

In the example shown in FIG.4, the system 400 includes a server 450, which may run on a physical computer or a virtual machine. The server 450 may include a mobility manager 402, which may be connected to one or more transceiver sites (e.g., one or both of the illustrative base stations 130A-B shown in FIG.1) in an ENG network. In some embodiments, the mobility manager 402 may perform one or more network management functions. For instance, the mobility manager 402 may be adapted to track the location of a mobile ENG unit (e.g., one of the OB vehicles 110A-B). As one example, the mobility manager 402 may receive signal strength information regarding the mobile ENG unit from one or more transceivers and/or transceiver sites. The mobility manager 402 may be adapted to process the signal strength information to update the mobile ENG unit's location. As another example, the mobility manager 402 may receive location information (e.g., GPS coordinates). Location information received from other sources may also be used, as aspects of the present disclosure are not limited to the use of any particular type of location information.

In some embodiments, the mobility manager 402 may be adapted to handle moving communications between transceiver sites and/or between transceivers within a site. For example, the mobility manager 402 may analyze signal strength information and/or GPS information to determine whether to move a communication session of the mobile ENG unit from one transceiver site to another, or from one transceiver to another within the same site. In some embodiments, the mobility manager 402 may be coupled to a serving gateway 403 to coordinate traffic routing. For example, the mobility manager 402 may identify to the serving gateway 403 which transceiver site and/or transceiver are presently handling a mobile ENG unit, and the serving gateway 403 may transport data packets (e.g., in the form of IP packets) destined for the mobile ENG unit to the identified transceiver site and/or transceiver for transmission over a radio frequency (RF) link (e.g., over a BAS frequency band).

In some embodiments, the mobility manager 402 may be adapted to perform processing related to security. For instance, the mobility manager may be adapted to engage in an authentication protocol with a mobile ENG unit before allowing the mobile ENG unit to connect to the ENG network. As discussed in detail below, it may be desirable to allow only authorized systems to connect to the ENG network, because unauthorized systems may not respect bandwidth allocations and may therefore cause congestion on the ENG network. However, it should be appreciated that authentication is not required, as in some embodiments any device may be allowed to connect to the ENG network.

In some embodiments, the mobility manager 402 may be adapted to perform one or more key management functionalities. For instance, the mobility manager may be adapted to distribute keys to one or more mobile ENG units for authentication, integrity, authenticity, authorization, and/or other purposes. In some embodiments, the mobility manager 402 may be coupled to a user database and authentication component 405, from which keys and/or other credentials for mobile ENG units may be retrieved. The user database and authentication component 405 may, in some embodiments, contain data associated with mobile ENG units such as security keys, serial numbers, capabilities, phone numbers, IP address ranges, etc.

In some embodiments, the serving gateway 403 may be coupled to a station gateway 404, which may in turn be coupled to the broadcaster station's network. When data packets are received from a mobile ENG unit, the serving gateway 403 may pass the packets along to the station gateway 404, which may identify a destination within the broadcast station for the data packets. Conversely, data packets originating from a device within the broadcast station may be provided to the station gateway 404, which may in turn forward the packets to the serving gateway 403 to be transmitted to a mobile ENG unit.

In some embodiments, the station gateway 404 may be connected to one or more servers that provide services to mobile ENG units. Examples of such servers include, but are not limited to, a video encoder/decoder bank and video distribution server 407, a data center server 408, a teleprompter server 409, and/or an intercom system 410.

In some embodiments, the video encoder/decoder bank and video distribution server 407 may include one or more video codecs adapted to encode one or more video and/or accompanying audio signals (e.g., video of a news anchor speaking at a broadcast station studio and/or video feed from a remote location) into a video-over-IP data stream for transmission to a mobile ENG unit via the station gateway 404. Additionally, or alternatively, a video codec may be adapted to decode a video-over-IP data stream (e.g., representing a reporter reporting from the field) received from a mobile ENG unit via the station gateway 404. The resulting video and/or accompanying audio signals may be distributed by the server 407 to one or more recipient devices at the broadcast station.

In some embodiments, the data center 408 may be adapted to support one or more business applications such as email, file transfer, chat, web browsing, VoIP, VPN, etc. For example, the data center server 408 may receive data packets from, and/or transmit data packets to, a computer (e.g., the illustrative computer 209 shown in FIG.2) on a mobile ENG unit via the station gateway 404. Any suitable combination of one or more business applications may be supported by the data center 408, as aspects of the present disclosure are not so limited.

In some embodiments, the system 400 may include a teleprompter server 409, which may be connected to a teleprompter (e.g., the illustrative teleprompter 210 shown in FIG.2) on a mobile ENG unit. The teleprompter server 409 may be coupled to the station gateway 404, and may be adapted to transmit information to the teleprompter via the station gateway 404. For example, the teleprompter server 409 may be adapted to transmit text or other information to be displayed to a reporter or another person on camera.

In some embodiments, the system 400 may include an intercom system 410, which may be connected to an intercom (e.g., the illustrative intercom 211 shown in FIG.2) on a mobile ENG unit. The intercom system 410 may be coupled to the station gateway 404, and may be adapted to carry out voice communication (e.g., using a VoIP protocol) with the intercom on the mobile ENG unit via the station gateway 404. This may allow a news crew in the field to speak with broadcast station staff conveniently in real time.

In some embodiments, the station gateway 404 may be coupled to a bonded connection manager 415 configured to aggregate bandwidth from multiple networks to emulate a single data pipe. Similar to the illustrative bonded connection manager 213 shown in the example of FIG. 2, the bonded connection manager 415 may be used to emulate a single data pipe using the transceiver site and/or one or more of the other network interfaces 420 (e.g., satellite, DSL, cable, Ethernet, fiber optic, WiFi, and/or public cellular networks).

In some embodiments, the server 450 may include an element manager 411, which may be adapted to manage one or more pieces of equipment, including any equipment on a mobile ENG unit, at a transceiver site, and/or in a broadcast station. The element manager 411 may communicate with a piece of managed equipment using any suitable protocol, including, but not limited to, an SNMP (Simple Network Management Protocol) protocol, a DLEP (Dynamic Link Exchange Protocol) protocol, a protocol based on a JSON (JavaScript Object Notation) data format, an RPC (Remote Procedure Call) protocol, and/or a suitable proprietary protocol (e.g., a proprietary protocol over IP). For example, the element manager 411 may use any one or more of these and/or other protocols to adjust a setting in a piece of equipment at a mobile ENG unit (e.g., to adjust a data rate at a video encoder to accommodate an additional mobile ENG unit communicating in a same frequency band).

In some embodiments, the server 450 may include a dashboard component for monitoring and/or managing operations of the ENG network. For instance, in the example shown in FIG.4, the server 450 includes a network/user management component 406, which may provide a user interface for one or more monitoring and/or management functionalities, including, but not limited to, modification of configuration settings, fault indication, etc. The network/user management component 406 may be used to monitor and/or manage the operation of any portion of the ENG network, including any equipment on a mobile ENG unit, at a transceiver site, and/or in a broadcast station. For example, in some embodiments, the network/user management component 406 may be coupled to the element manager 411 to obtain information to be displayed to a user and/or to provide user input to one or more managed devices via the element manager 411.

In some embodiments, the network/user management component 406 may be adapted to display status information relating to one or more mobile ENG units. Additionally, or alternatively, the network/user management component 406 may allow a user to add and/or remove a mobile ENG unit from the ENG network, and/or to modify what a mobile ENG unit may or may not be permitted to do.

In some embodiments, the server 450 may include a link metric collection component 401. The link metric collection component 401 may be adapted to collect performance data for one or more RF links. For instance, in some embodiments, the link metric collection component 401 may be coupled to one or more transceivers (e.g., one or more of the illustrative transceivers 302A-C shown in FIG.3) to receive information regarding one or more operating conditions. Examples of information that may be received from a transceiver include, but are not limited to, available uplink and/or downlink data rates, uplink and/or downlink latency, etc. The link metric collection component 401 may be adapted to report the link performance data to one or more other components. For example, the link metric collection component 401 may report the link performance data to the element manager 411, which may display the link performance data to a user and/or use the link performance data to adapt the operation of one or more components of the system 400. Alternatively, or additionally, the link metric collection component 401 may be adapted to provide the link performance data to a transceiver (e.g., the illustrative remote transceiver 204 shown in FIG.2) on a mobile ENG unit. In this manner, the operation of one or more components on the mobile ENG unit may be adapted based on the link performance data. For example, a video encoder (e.g., the illustrative video encoder 207A shown in FIG.2) on the mobile ENG unit may use the link performance data (e.g., available bandwidth) to adaptively update one or more compression/decompression algorithm parameters.

The inventors have recognized and appreciated that a component residing at a transceiver site or broadcast station may have a more comprehensive view of the ENG network. For instance, such a component may be able to observe activities of multiple mobile ENG units. Therefore, it may be desirable to collect and aggregate link performance data at a component residing at a transceiver site or broadcast station (e.g., the link metric collection component 401). However, it should be appreciated that aspects of the present disclosure are not so limited, as in some embodiments link performance data may be collected by a component on a mobile ENG unit (e.g., a component coupled to the illustrative remote transceiver 204 shown in FIG.2) in addition to, or instead of, the link metric collection component 401. Furthermore, it should be appreciated that aspects of the present disclosure are not limited to the use of link performance data to adapt device operations.

It should also be appreciated that aspects of the present disclosure are not limited to the particular combination or arrangement of components shown in FIG.4, as other combinations and arrangements may be used. For example, although discrete components are shown in FIG. 4, some of the components may be implemented at least in part in software and may execute on the same hardware. Furthermore, the functionalities of the components may be distributed in any suitable manner among multiple computers.

Figure 5:
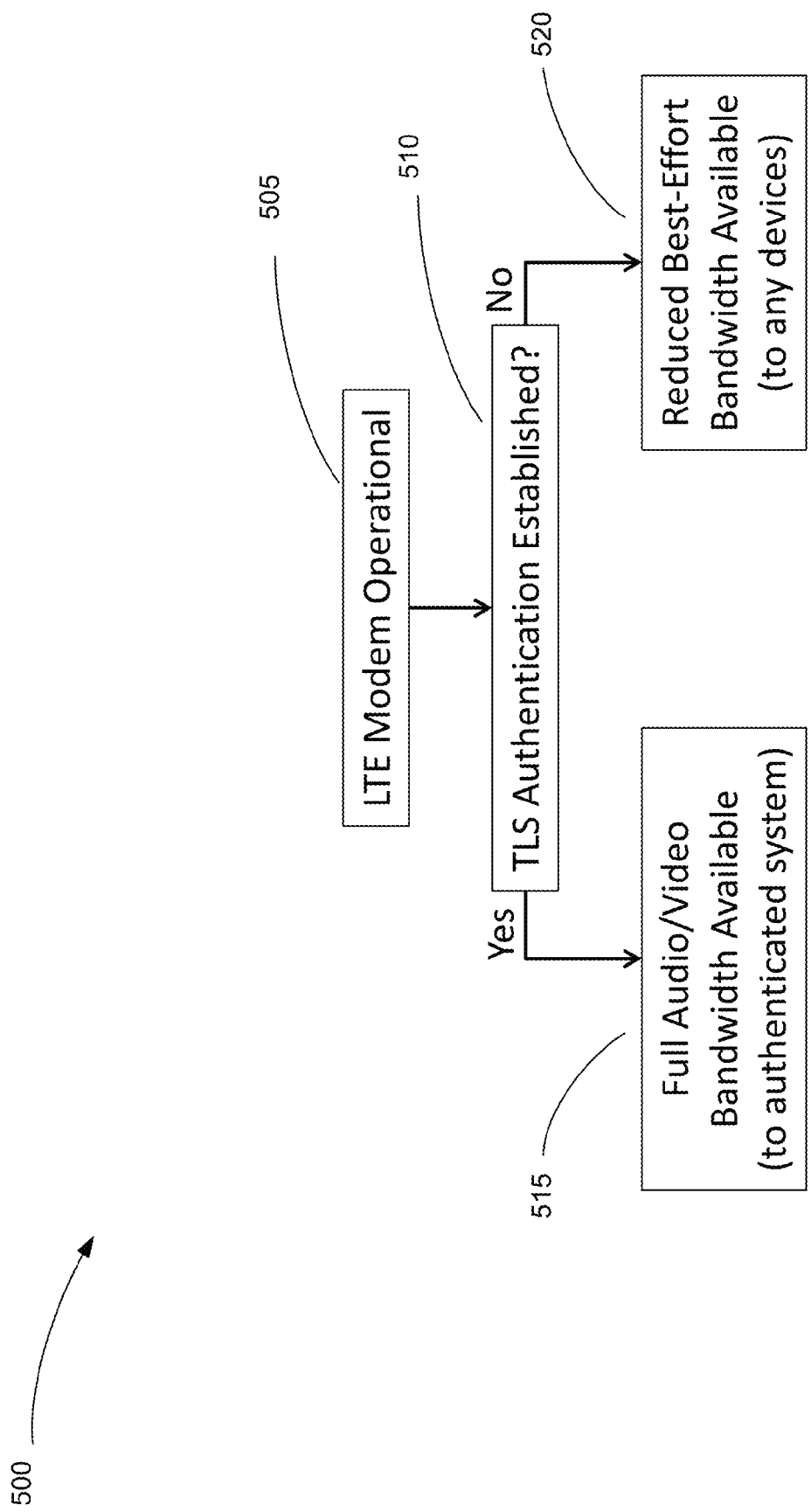
FIG.5 shows an illustrative process 500 that may be performed between an encoder/decoder (codec) and a network modem, in accordance with some embodiments.

FIG.5 shows an illustrative process 500 that may be performed between an encoder and a network modem, in accordance with some embodiments. For example, the illustrative remote transceiver 204 of FIG.2 may include a modem, and the illustrative process 500 may be performed by the illustrative remote transceiver 204 to determine whether to provide video transport service to the illustrative video encoder 207A.

At act 505, the network modem may operate to establish a communication link with another network modem (e.g., one or more of the illustrative transceivers 302A-C). In some embodiment, the network modem may be coupled to an antenna for wireless communication. For example, the network modem and antenna may implement an LTE protocol. However, it should be appreciated that the process 500 is not limited to being used by an LTE modem, as other types of communication technologies may also be used, including, but not limited to, Ethernet, WiFi, cable, satellite, etc.

At act 510, the network modem may receive a request from a device to access the communication link. For example, the network modem may receive a request from an encoder (e.g., the illustrative video encoder 207A shown in FIG.2) to transmit video and/or audio over the communication. In response, the network modem may engage in an authentication protocol with the encoder to determine whether to allow the encoder to transmit and/or what level of service to provide to the encoder.

The inventors have recognized and appreciation that it may be desirable to allow only authorized systems to connect to an ENG network, because unauthorized systems may not cooperate with other systems connected the ENG network to share bandwidth, which may cause congestion on the ENG network. For instance, an unauthorized system may not implement one or more of the resource sharing schemes described herein and may attempt to transmit video and/or audio without regard to the needs of other systems connected to the ENG network. This may negatively impact the ability of an authorized system to transmit high quality video and/or audio signals.

Any suitable authentication mechanism may be implemented between an encoder and a network modem, as aspects of the present disclosure are not limited to the choice of any particular authentication mechanism. In some embodiments, a suitable public key authentication protocol may be used, including, but not limited to, a transport layer security (TLS) protocol according to Request for Comments (RFC) 2246 published by the Internet Engineering Task Force (IETF). The inventors have recognized and appreciated that a TLS protocol may advantageously provide not only authentication, but also a secured communication channel. In some embodiments, such a secure channel may be used to convey management information between the encoder and the network modem (e.g., bandwidth information for use by the encoder to determine whether and/or how to adapt one or more encoding parameters). However, it should be appreciated that aspects of the present disclosure are not limited to the use of a TLS protocol, or to the use of an authentication mechanism at all.

In some embodiments, a vendor of an ENG system may act as a certificate authority that issues certificates for use in an authentication protocol. However, that is not required, as any suitable entity may act as a certificate authority, including, but not limited to, commercial providers of digital certificates.

Returning to FIG.5, if the device requesting service (e.g., the illustrative video encoder 207A shown in FIG.2) successfully completes the authentication protocol, the process 500 may proceed to act 515 and the network modem may grant access to the communication link. For example, the requesting device may be granted full access to all available bandwidth, or any level of access requested by the device. If, on the other hand, the requesting device fails to successfully authenticate, the network modem may provide only a reduced level of service (e.g., best-effort delivery). For example, a low bit rate channel may be established, which may be sufficient for a reduced set of one or more functionalities (e.g., basic data communication and/or VoIP services), but may not cause any significant decrease in the bandwidth available to other systems on the ENG network. Such a channel may advantageously allow a mobile ENG unit to communication with a broadcast station or some other entity, for example, for diagnostic or emergency purposes. However, it should be appreciated that aspects of the present disclosure are not limited to providing a reduced level of access to an unauthenticated device, as in some embodiments the network modem may deny access entirely.

Figure 6:
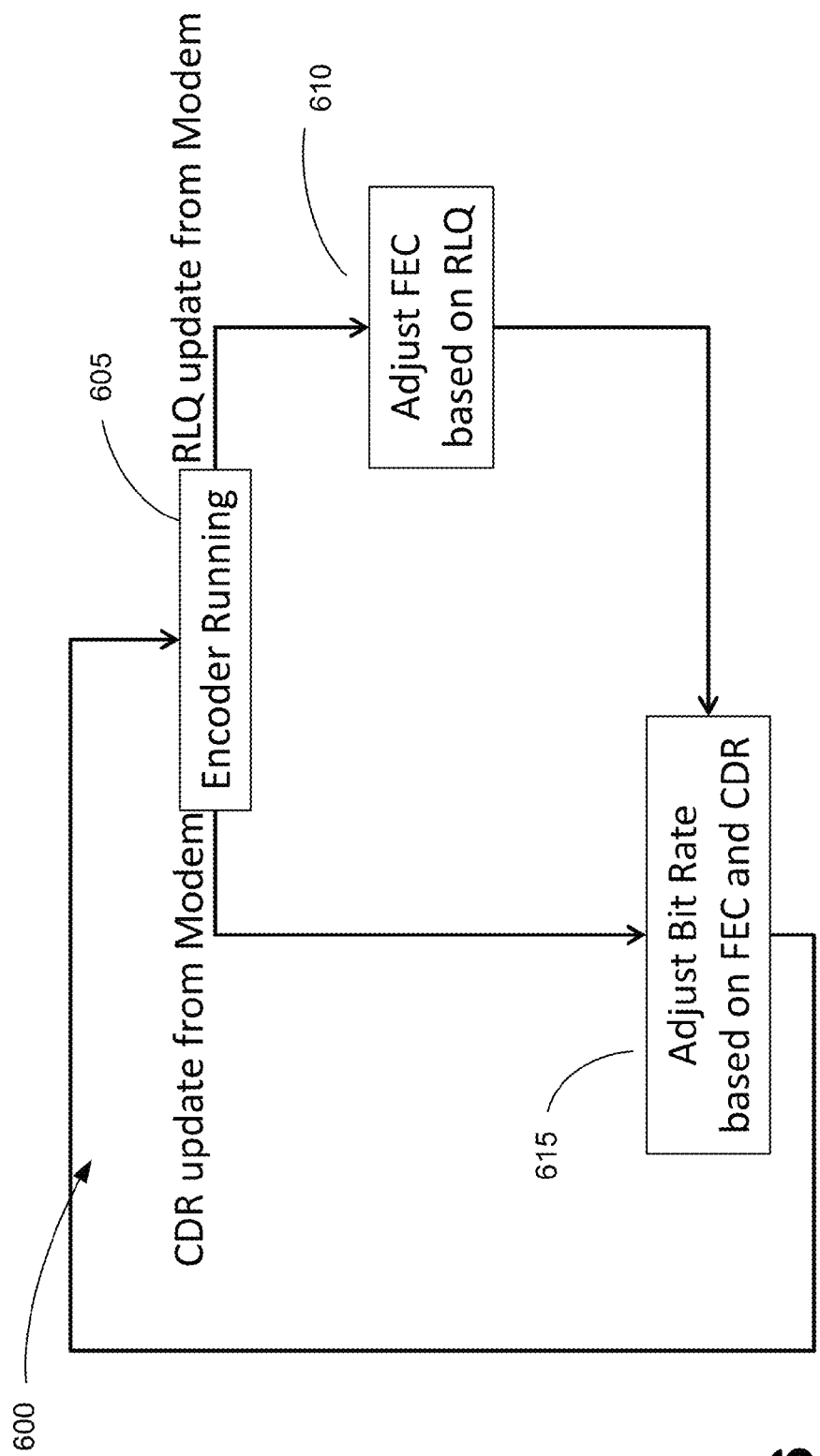
FIG.6 shows an illustrative process 600 that may be performed by a codec to adjust one or more operating parameters, in accordance with some embodiments.

FIG.6 shows an illustrative process 600 that may be performed by an encoder to adjust one or more operating parameters, in accordance with some embodiments. For example, the process 600 may be performed by the illustrative video encoder 207A shown in FIG.2 to adjust one or more parameters used in an encoding operation. In some embodiments, an adjustment may be based on one or more operating conditions (e.g., air link quality, network traffic, characteristics of the input video signal, etc.).

The inventors have recognized and appreciated that, unlike traditional microwave systems, an ENG network according to some embodiments of the present disclosure may allow multiple mobile ENG units to transmit data to a broadcast station simultaneously. If more than one mobile ENG unit is actively transmitting, it may be desirable to coordinate sharing of available bandwidth among the units (e.g., so that no mobile ENG unit is left starving).

The inventors have further recognized and appreciated that the network modem may have knowledge of how much bandwidth is available at any given moment in time. For example, the network modem may receive bandwidth information from a network manager (e.g., the illustrative network manager 140 shown in FIG.1). Additionally, or alternatively, the network modem may estimate available bandwidth based on observed performance (e.g., round trip delay, packet loss, etc.). In an embodiment in which the network modem is based on a wireless communication technology (e.g., LTE, WiFi, WiMAX, etc.), available bandwidth may depend on RF conditions (e.g., moisture in the air, birds flying by, etc.)

Accordingly, at act 605, the encoder may request and/or receive network condition information from a modem. Examples of network protocols and/or data formats that may be used for this information exchange include, but are not limited to, SNMP, DLEP, JSON, RPC, etc. Any suitable combination of one or more of these protocols, and/or any proprietary protocol (e.g., a proprietary protocol over IP), may be used.

In some embodiments, the network modem may provide data rate information to the encoder, such as a maximum data rate (MDR) and/or a current data rate (CDR). This information may be provided at any suitable frequency (e.g., every second, every two seconds, every three seconds, etc.), and/or in response to some trigger. Additionally, or alternatively, the modem may provide link quality information, such as Relative Link Quality (RLQ) according to a DLEP specification. In some embodiments, the RLQ may be dimensionless number between 1 and 100, where a value of 100 indicates a link of the highest quality. However, it should be appreciated that aspects of the present disclosure are not limited to the use of any particular measure of link quality, or to the use of link quality information at all.

In some embodiments, the encoder may be adapted to adjust one or more operating parameters to match the available bandwidth indicated by the network condition information received from the modem. As one example, at act 610, the encoder may adjust one or more parameters for forward error correction (FEC) based on link quality. For instance, in some embodiments, an SMPTE 2022 algorithm may be used for FEC, and the encoder may adjust a number of rows and/or a number of columns based at least in part on an RLQ. For example, the encoder may use 20 columns if the RLQ is less than 50, and 10 columns if the RLQ is between 50 and 100. Additionally, or alternatively, the encoder may select a number of rows between 1 and 10 in a direct linear proportion to the RLQ. However, it should be appreciated that these examples are merely illustrative, as aspects of the present disclosure are not limited to the use of any particular method for adjusting FEC parameters, or any such adjustment at all.

As another example, the encoder may adjust an encoder data rate based on the network condition information received from the modem. For instance, at act 615, the encoder may adjust the data rate based on a CDR of the modem and/or based on one or more FEC parameters selected based on the RLQ at act 610. For example, for a given CDR and RLQ, the encoder may select the FEC parameters as described above, compute an FEC overhead, subtract the FEC overhead from the CDR, and set the encoder's overall data rate to the remaining capacity.

Although examples of network condition information are discussed above, it should be appreciated that aspects of the present disclosure are not limited to the use of any particular type of network condition information to adapt the operation of an encoder. For instance, aspects of the present disclosure are not limited to the use of MDR, CDR, or RLQ, as in some embodiments other types of network condition information may be used. Moreover, aspects of the present disclosure are not limited to the use of any particular method for adapting the operation of an encoder, or to any adaptation at all.

Figure 7:
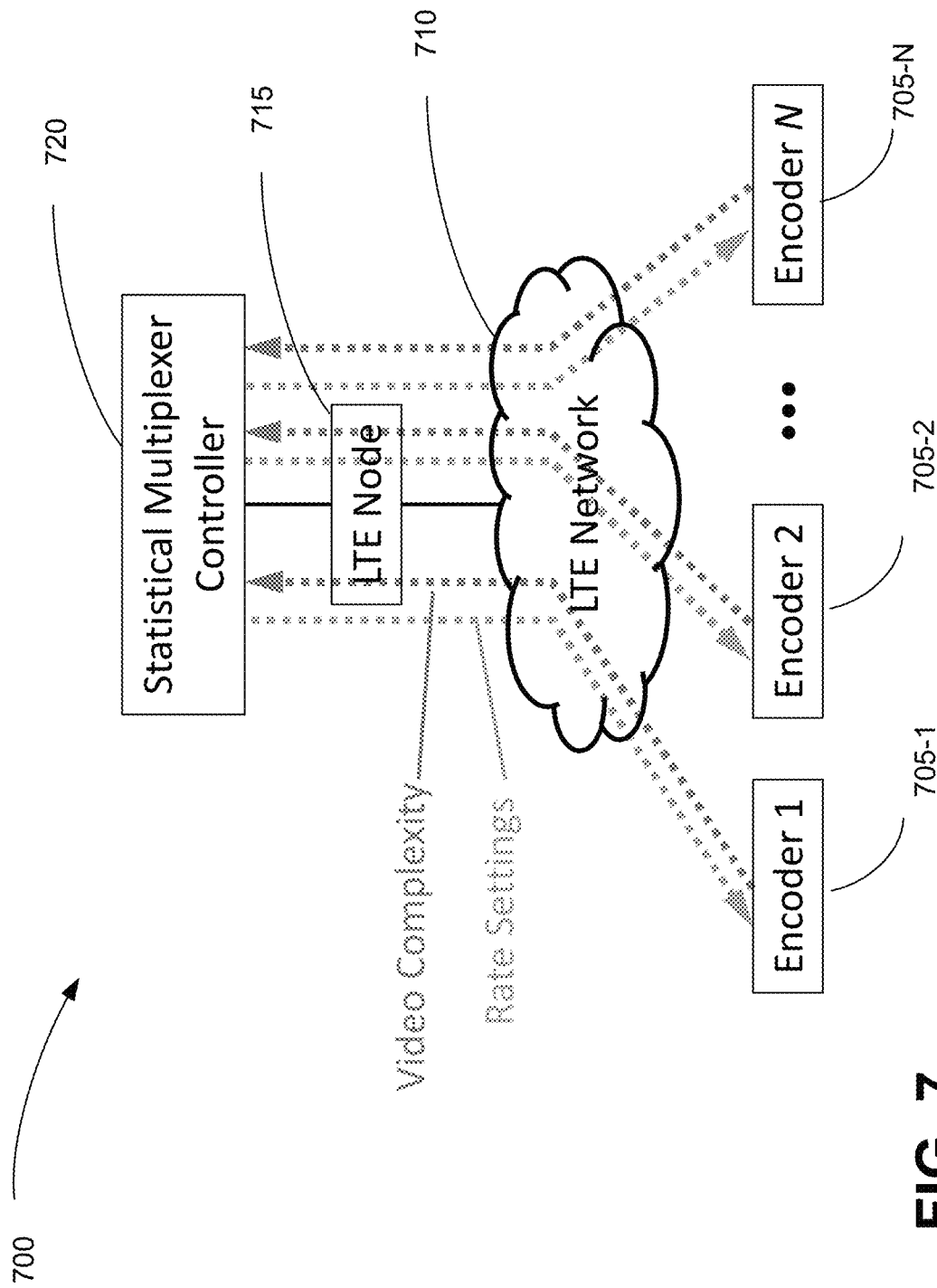
FIG.7 shows an illustrative system 700 in which one or more statistical multiplexing techniques may be used, in accordance with some embodiments.

FIG. 7 shows an illustrative system 700 in which one or more statistical multiplexing techniques may be used, in accordance with some embodiments. The inventors have recognized and appreciated that a statistical multiplexing technique may be used to dynamically adjust a bit rate of an encoder based on a complexity measure of an input video signal. However, it should be appreciated that aspects of the present disclosure are not limited to the use of any statistical multiplexing technique, or any dynamic bit rate adjustment.

In the example of FIG. 7, the system 700 includes a plurality of encoders 705-1, . . . , 705-N. In some embodiments, one or more of these encoders may be installed at respective ENG units (e.g., the illustrative OB vehicles 110A-B or fixed ENG unit 115 shown in FIG. 1) and may be adapted to process video and/or audio signals received from respective cameras (e.g., the illustrative camera 208A shown in FIG. 2). Such an encoder may use the input video and/or audio signals to generate a video-over-IP data stream for transmission via a network, such as an LTE network 715. However, it should be appreciated that aspects of the present disclosure are not limited to the use of LTE, as in some embodiments any suitable combination of one or more networking technologies may be used in addition to, or instead of, LTE.

In some embodiments, the system 700 may include a statistical multiplexer controller 720, which may by adapted to assign respective bit rates to one or more of the encoders 705-1, . . . , 705-N. For instance, the controller 720 may receive video complexity information from some or all of the encoders 705-1, . . . , 705-N, and may assign respective bit rates to one or more of the encoders 705-1, . . . , 705-N based on the received video complexity information. In this manner, the controller 720 may have a global view of relative bandwidth demands at some or all of the encoders, and may use that global information to determine how much bandwidth should be allocated to an individual encoder.

It should be appreciated that the set of one or more encoders from which video complexity information is received may, although need not, be the same as the set of one or more encoders to which respective bit rates are assigned. For example, the bit rate assigned to a particular encoder may or may not depend on a video complexity reported by that encoder. Furthermore, although in some of the examples described herein all of the encoders 705-1, . . . , 705-N participate in a collective bandwidth allocation scheme, it should be appreciated that aspects of the present disclosure are not so limited. For example, in some embodiments, one or more encoders transmitting over a network (e.g., the LTE network 715) may not be subject to any bandwidth restrictions, or may have bandwidths allocated in a different manner. Further still, it should be appreciated that the statistical multiplexing techniques described herein are not limited to being used with video encoding, as in some embodiments other types of information may be encoded and transmitted over the network.

The inventors have recognized and appreciated that some statistical multiplexing techniques have been used in conventional satellite and cable systems. In such systems, total available bandwidth on a communication pipe shared by multiple encoders may not fluctuate significantly over time and therefore may be assumed to be constant (i.e., not changing over time). Thus, portions of the total available bandwidth may be allocated to respective encoders simply based on the video complexity measures reported by the encoders.

However, the inventors have recognized and appreciated that in some types of networks, the total available bandwidth on the communication pipe shared by the encoders may be variable over time. Additionally, or alternatively, each encoder may encounter different network conditions and therefore may have a different maximum data rate. For example, in a wireless network, the air link quality between a terminal and a base station may vary depending on a number of factors, including, but not limited to, air moisture content, birds flying by, obstacles (e.g., buildings, trees, etc.) appearing or disappearing due to the terminal's movement, interference from other signals, etc. Accordingly, the inventors have recognized and appreciated that improved statistical multiplexing techniques may be desirable, for example, to manage a plurality of encoders with variable video complexity, variable individual bandwidth, and/or variable total bandwidth.

In some embodiments, statistical multiplexing techniques may be provided that take into account not only the complexity of an input video for an encoder, but also current bandwidth conditions from a network modem coupled to the encoder. For example, if an encoder has low last mile bandwidth, a low bit rate may be assigned even if the encoder is experiencing high video complexity.

In some embodiments, time may be divided into slots for purposes of bandwidth management. Each time slot may have any suitable duration, including, but not limited to, 50 msec, 100 msec, 150 msec, etc. During a time slot (e.g., at the beginning), some or all of the encoders 705-1, . . . , 705-N may report respective video complexity measures to the statistical multiplexer controller 720. Any suitable measure may be used, including, but not limited to, a number of bits generated during a time slot by performing a constant quality first pass encoding.

Furthermore, an encoder may report a video complexity measure to the controller 720 in any suitable manner. For instance, in some embodiments, the controller 720 may be located at a broadcast station (e.g., the illustrative broadcast station 120 shown in FIG.1), and an encoder installed on a mobile ENG unit may transmit video complexity information to the controller 720 via an ENG network (e.g., via the illustrative remote transceiver 204 shown in FIG.2 and one of the illustrative transceivers 302A-C shown in FIG.3). In the example shown in FIG.7, the controller 720 may receive video complexity information via an LTE node 715, which may be part of the LTE network 710. However, it should be appreciated that aspects of the present disclosure are not limited to a statistical multiplexer controller being located at a broadcast station, as in some embodiments a statistical multiplexer controller may be located at a mobile ENG unit and may receive video complexity information from other mobile ENG units. For instance, in the example shown in FIG.7, the LTE node 715 may forward video complexity information received from one encoder to another encoder. Moreover, a statistical multiplexer controller may be implemented in any suitable manner, such as via software running on a general-purpose computer, and/or special hardware configured to perform one or more statistical multiplexing functionalities.

In some embodiments, the controller 720 may use the received video complexity information to assign respective bit rates to one or more of the encoders 705-1, . . . , 705-N. This allocation may be effective for the same time slot during which the video complexity information is received, or the next time slot. The inventors have recognized and appreciated that video complexity may change quickly (e.g., during the reporting of a game of some fast-moving sport) and therefore it may be desirable to make allocation decisions based on fresh information, such as information that is no more than a few time slots old. However, it should be appreciated that aspects of the present disclosure are not so limited.

Below is a detailed description of an illustrative process that may be performed by the controller 720 to assign respective bit rates to one or more of the encoders 705-1, . . . , 705-N. In this example:

N may denote a number of encoders participating in a cooperative bandwidth allocation scheme;

$C_{ij}$ may denote a measure of video complexity at encoder i during time slot j;

$B_j$ may denote a total available bandwidth during time slot j;

$M_{ij}$ may denote a maximum bandwidth achievable for encoder i during time slot j (e.g., the CDR discussed above in connection with FIG.6); and $R_{ij}$ may denote a data rate allocated to encoder i during time slot j.

In some embodiments, $B_j$ (total available bandwidth during time slot j) may be dependent upon overall RF link quality observed by the controller 720. However, that is not required, as $B_j$ may alternatively, or additionally, depend on one or more other factors.

In some embodiments, the controller 720 may perform the following acts iteratively:

1. For time slot j, the controller 720 may allocate initial bit rates for the encoders based on relative demands. For example, the controller 720 may allocate initial bit rates proportionally, as follows:

$$R_{ij} = \frac{C_{ij}}{\sum_{k=1}^{N} C_{kj}} B_j$$

2. If $R_{ij} \leq M_{ij}$, for every i=1 . . . N, the controller 720 may stop and notify the encoders of the $R_{ij}$ values (e.g., by sending the values over the LTE network 710). Otherwise, the controller 720 may proceed to act 3.

3. The controller 720 may divide the encoders into three sets A, B and C, as follows:
   Set A may include all the encoders for which $R_{ij} > M_{ij}$;
   Set B may include all the encoders for which $R_{ij} < M_{ij}$; and
   Set C may include all the encoders for which $R_{ij} = M_{ij}$.

4. The controller 720 may adjust the respective bit rates for the encoders in the sets A and B, for example, to collect allocated but unused bandwidth from the encoders in the set A (e.g., because the encoders in the set A have low air link quality), and redistribute the collected bandwidth among the encoders in the set B (which may have good air link quality). The redistribution may be done based on relative demands among the encoders in the set B. For example, the controller 720 may adjust the respective bit rates as follows:
   For set A, assign $R_{ij} = M_{ij}$; and
   For set B, assign $$R_{ij} = \frac{C_{ij}}{\sum_{k \in B} C_{kj}} \left( B_j - \sum_{k \in A} M_{kj} - \sum_{k \in C} M_{kj} \right)$$

5. The controller 720 may go back to act 2, and may repeat acts 2-5 until the stopping condition in act 2 is satisfied.

In some embodiments, each encoder may set an appropriate video bit rate based on an $R_{ij}$ value received from the controller 720 (e.g., an $R_{ij}$ value calculated according to the above-described process). Additionally, or alternatively, the video bit rate may be set taking into account any FEC overhead (e.g., based on the SMPTE 2022 settings discussed above in connection with FIG.6).

It should be appreciated that the details presented above, including the formulas for assigning bit rates, are provided solely for purposes of illustration, and that the statistical multiplexing techniques described herein are capable of different manners of implementation. For example, in some embodiments, no controller may be used. Each participating encoder may calculate a bit rate locally, but in a cooperative fashion. For example, each encoder may calculate a bit rate based on video complexity and/or last mile data rate information regarding other encoders (e.g., to reduce network congestion, and/or to ensure that no one encoder is starving). Moreover, it should be appreciated that the statistical multiplexing techniques described herein are not limited to being used in a wireless network, as in some embodiments one or more of the statistical multiplexing techniques may be used in connection with another type of network (e.g., Ethernet, cable, satellite, etc.).

The inventors have recognized and appreciated that using statistical multiplexing to allocate bandwidth among multiple encoders may provide certain advantages over simply assigning priorities among the encoders. For example, under a statistical multiplexing scheme, every encoder may be allocated some bandwidth and hence may be able to transmit some video (albeit at lower quality). By contrast, under a simple priority scheme, an encoder with lower priority may at times get no bandwidth at all and may be unable to transmit any video. For example, data packets transmitted from a lower priority encoder may be dropped when a higher priority encoder is transmitting high quality video. However, it should be appreciated that aspects of the present disclosure are not limited to the use of statistical multiplexing, as in some embodiments a priority scheme may be used in combination with, or instead of, statistical multiplexing.

Figure 8A:
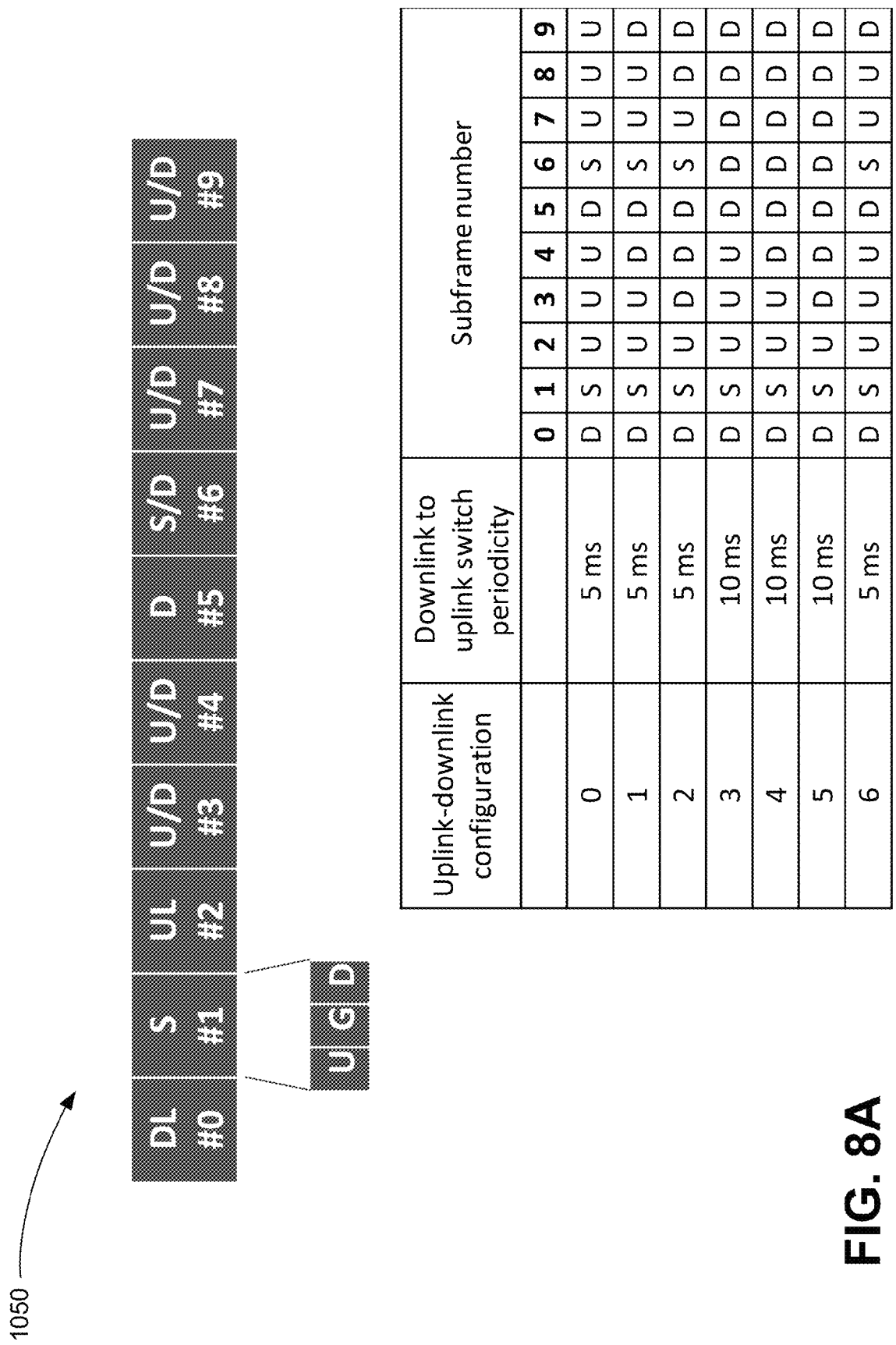
FIG.8A shows an illustrative radio frame 1050 for a flexible time division multiplex scheme, in accordance with some embodiments.

FIG. 8A shows an illustrative radio frame 1050 for a flexible time division duplex scheme, in accordance with some embodiments. The inventors have recognized and appreciated that, unlike conventional cellular traffic, ENG-related traffic may at times be uplink biased (e.g., more data going from a mobile or fixed terminal, such as an OB vehicle, to a station, compared to data going in the other direction). Accordingly, in some embodiments, more bandwidth may be allocated to uplink traffic than to downlink traffic during some time periods.

Figure 8B:
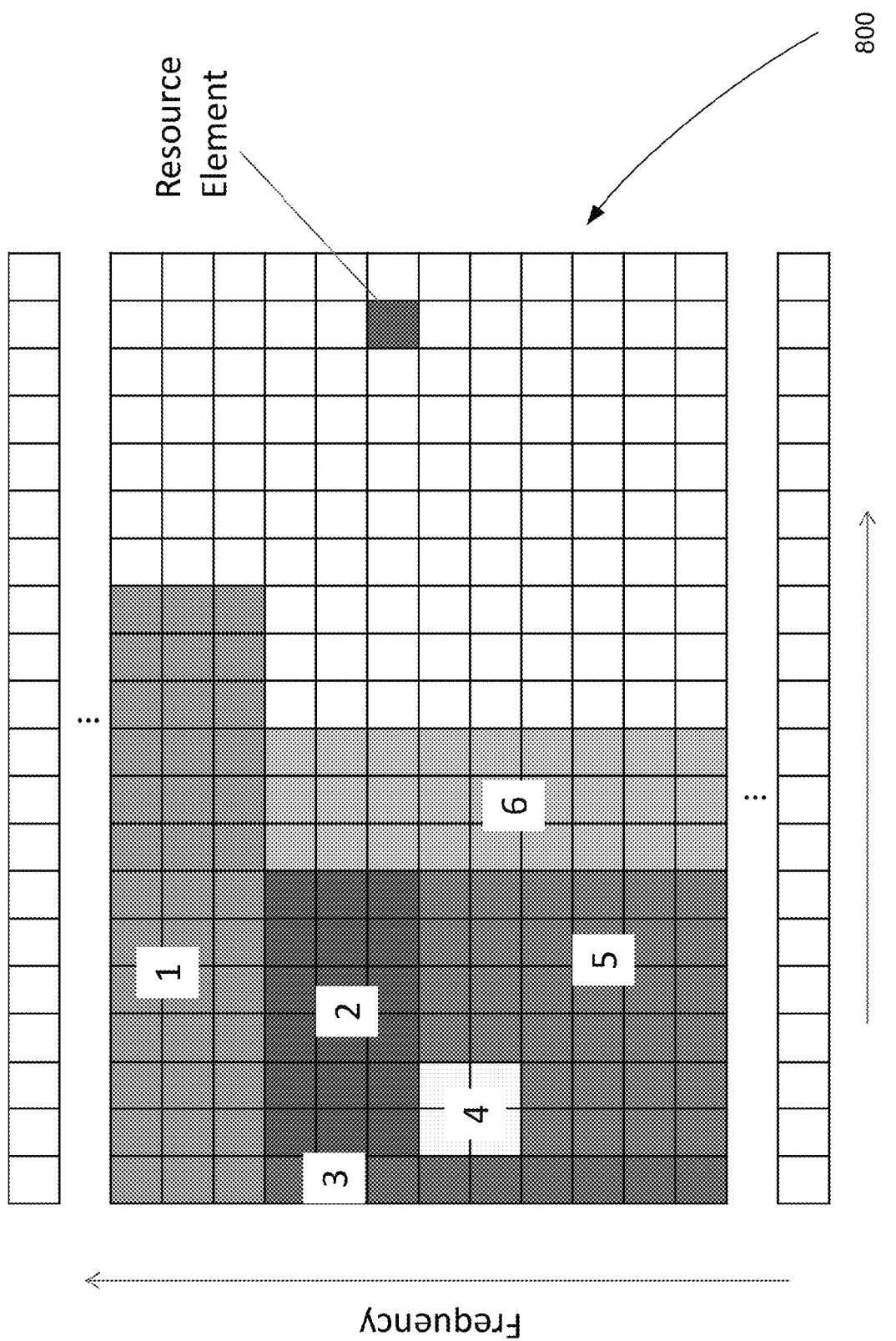
FIG.8B shows an illustrative resource block 800 in a resource allocation scheme, in accordance with some embodiments.

The inventors have recognized and appreciated that it may be desirable to include in every radio frame at least one time slot that is designated for downlink only. For example, a designated downlink time slot may be used by a base station transceiver to provide information to a remote transceiver (e.g., the illustrative remote transceiver shown in FIG. 2). Examples of such information include, but are not limited to, synchronization information and/or one or more communication parameters to be used by the remote transceiver. Any suitable combination of one or more communication parameters may be provided to the remote transceiver, such as an identity of the base station transceiver, location information (e.g., time and/or frequency) specifying one or more resource blocks that may be used by remote transceivers to initiate communication with the base station transceiver (e.g., to establish a communication link with the base station transceiver), transmission bandwidth (e.g., overall bandwidth available at the base station transceiver, which may, in some embodiments, be between 5 MHz and 10 MHz), an uplink/downlink allocation pattern (e.g., as shown in FIG. 8A), and resource element configuration (e.g., as shown in FIG. 8B and discussed below).

However, it should be appreciated that aspects of the present disclosure are not limited to the use of a designated downlink time slot, as in some embodiments a radio frame may include no downlink time slot at all, or a downlink time slot may appear anywhere within in a radio frame, with no designated placement.

In some embodiments, a radio frame may include a special subframe having a downlink portion, a time gap where there is neither uplink or downlink usage, and an uplink portion. The downlink portion may be used to send synchronization information, for example, to allow a remote transceiver to quickly identify an available base station, and/or to allow time synchronization so that time slot boundaries are known. Additionally, or alternatively, the synchronization information may include information (e.g., an identification of a particular base station) that may be used by a remote transceiver to differentiate between multiple base stations that are sharing a same frequency channel.

In some embodiments, an uplink portion of a special subframe may be used by a remote transceiver to send a signal to a base station to request timing correction data. In response to receiving such a request, a base station may transmit timing corrected data in a downlink time slot. The presence of a time gap in the special subframe where there is neither uplink or downlink usage may advantageously allow the request and transmission of timing correction data without interfering with the base station's communication with other mobile ENG units. However, it should be appreciated that aspects of the present disclosure are not limited to the use of a time gap.

In some embodiments, an allocation pattern may be chosen from multiple available allocation patterns, such as the seven allocation patterns listed in the table shown in FIG. 8A. Each allocation pattern may, although need not, designate one or more subframes for downlink usage. For instance, in the example shown in FIG. 8A, subframe nos. 0 and 5 may be designated for downlink usage. Likewise, each allocation pattern may, although need not, designate one or more subframes for uplink usage. For instance, in the example shown in FIG. 8A, subframe no. 2 may be designated for uplink usage. Likewise, each allocation pattern may, although need not, designate one or more subframes as a special subframe. For instance, in the example shown in FIG. 8A, subframe no. 1 may be designated as a special subframe.

In some embodiments, some subframes may be used for either downlink or uplink. For example, each of subframe nos. 3, 4, 7, 8, and 9 may be used for uplink or downlink. In some embodiments, some subframes may be used for downlink or as a special subframe. For example, subframe no. 6 may be used as a special subframe or for downlink. If subframe no. 6 is to be used as a special subframe, each of subframes no. 7, 8, and 9 may be used for uplink or downlink. If subframe no. 6 is to be used for downlink, then all of subframes no. 7, 8, and 9 may be used for downlink.

Although examples of allocation patterns are shown in FIG. 8A, it should be appreciated that such examples are provided merely for purposes of illustration, and that aspects of the present disclosure are not limited to the use of any specific allocation pattern, or any specific list of available allocation patterns.

In some embodiments, switching from one allocation pattern to a different allocation pattern (e.g., switching one or more subframes between downlink and uplink) may be directed by a manager in an ENG network (e.g., the illustrative element manager 411 shown in FIG. 4). The manager may direct a switch in response to operator input. Alternatively, or additionally, the manager may observe traffic demands and direct a switch to better meet the demands. For instance, the manager may direct a switch from downlink to uplink in response to detecting that uplink subframes are nearly completely used, while downlink subframes are not fully used. In this manner, total bandwidth may be flexibly allocated between the uplink (e.g., from a mobile ENG unit to a transceiver site) and the downlink (e.g., from a transceiver site to a mobile ENG unit). However, it should be appreciated that aspects of the present disclosure are not limited to the use of a flexible allocation scheme, as in some embodiments bandwidth allocation between the uplink and the down link may be fixed.

In some embodiments, a selected allocation pattern (e.g., one of the seven patterns shown in FIG. 8A) may be broadcast to all mobile ENG units by a network manager. One or more techniques may be used to ensure that the allocation pattern is reliably received by all mobile ENG units. For example, in some embodiments, the selected pattern may be broadcast in subframe no. 0 (which may be designated for downlink usage) over a number of consecutive frames (e.g., four consecutive frames). Additionally, or alternatively, the selected pattern may be broadcast with one or more error correcting techniques (e.g., Forward Error Correction, or FEC).

The inventors have recognized and appreciated that a manner in which a selected allocation pattern is made known to the mobile ENG units may impact how frequently the allocation pattern may be changed. For instance, if each frame is 10-msec long and each selected allocation pattern is broadcast over four consecutive frames, a change in allocation pattern may be initiated at most once every 40 msec. The inventors have further recognized and appreciated that although frequent changes in allocation pattern may allow rapid responses to changing traffic demands, frequent changes may lead to increased complexity. Accordingly, in some embodiments, a change in allocation pattern may only take place at certain designated times (e.g., based on a time interval defined as an integer number of frames), which may reduce complexity. As one example, a 5-frame time interval may be used, so that a change may take place only 5 frames after the last change, 10 frames after the last change, 15 frames after the last change, etc. As another example, a 10-frame time interval may be used, so that a change may take place only 10 frames after the last change, 20 frames after the last change, 30 frames after the last change, etc.

The inventors have recognized and appreciated that the use of one or more of the techniques describe above may improve the likelihood that all mobile ENG units will be notified of a change in allocation pattern, thereby reducing the likelihood of a mobile ENG unit inadvertently transmitting during a downlink subframe. However, the inventors have also recognized and appreciated that it may be desirable to allow rapid changes. Accordingly, in some embodiments, information indicative of the allocation of one or more subsequent frames and/or subframes may be sent in any presently configured downlink subframe.

FIG.8B shows an illustrative resource block 800 in a resource allocation scheme, in accordance with some embodiments. For example, the illustrative resource allocation scheme shown in FIG.8B may be used to allocate capacity within a time slot to multiple ENG units sharing a channel (e.g., the illustrative OB vehicles 110A-B or fixed ENG unit 115 communicating with the illustrative base station 130A shown in FIG.1).

The inventors have recognized and appreciated that it may be beneficial to provide bandwidth allocation responsive to traffic demands from ENG units. For example, rapid and responsive allocation may facilitate the use of one or more statistical multiplexing techniques, such as those described above in connection with FIG.7. The inventors have further recognized and appreciated some disadvantages of other methods for bandwidth allocation. As one example, Carrier Sense Multiple Access (CSMA) such as that used for WiFi may be inefficient due to collisions when a link is operated near capacity for multiple users. As another example, a Time Division Multiple Access (TDMA) waveform that allocates all the bandwidth to one user at one time may be either inefficient or less responsive (e.g., by waiting until a TDMA slot is full before allocating that slot to a user).

In some embodiments, a multi-frequency, time division resource allocation scheme may be used to divide a frequency band (e.g., a BAS frequency band) into multiple time-frequency resource elements. For instance, each resource element may correspond to a subcarrier (e.g., a subcarrier that is 180 kHz wide) in the frequency band and a certain time interval. The inventors have recognized and appreciated that a short time interval may be desirable, for example, to allow responsive adjustments to time varying traffic demand and to provide for effective statistical multiplexing. However, the inventors have also recognized and appreciated that shorter time intervals may be less spectrum efficient than longer intervals, because there may be overhead associated with each time interval. For example, a time guard period during which no data is transmitted may be included for each time interval to prevent collision due to imperfect synchronization. Thus, if shorter time intervals are used, more time guard periods may be included per unit time, so that a higher percentage of bandwidth may remain unused.

Accordingly, in some embodiments, a 1 msec time interval may be used and may reflect a desired tradeoff between responsiveness and spectrum efficiency. However, it should be appreciated that aspects of the present disclosure are not limited to the use of any particular time interval for a resource element.

In some embodiments, the time interval for a resource element may be defined in terms of a number of symbols (e.g., orthogonal frequency-division multiplexing, or OFDM, symbols). For example, each resource element may be 1-symbol long, 2-symbol long, 3-symbol long, 4-symbol long, 5-symbol long, 6-symbol long, 7-symbol long, 8-symbol long, 9-symbol long, 10-symbol long, 11-symbol long, 12-symbol long, 13-symbol long, 14-symbol long, etc. In some embodiments, a subframe may include two groups of symbols, each group being 7-symbol long, and a resource element may have the same length as a subframe. However, it should be appreciated that aspects of the present disclosure are not limited to the use of any particular number of symbols for a resource element.

In some embodiments, one or more sub-blocks within a resource block may be allocated to a mobile ENG unit based on traffic demand and/or quality of service required. For instance, in the example shown in FIG.8B, multiple groups of sub-blocks (labeled "1," "2,", "3," . . . ) may be assigned respectively to multiple mobile ENG units. However, it should be appreciated that aspects of the present disclosure are not limited to the use of any particular method for assigning resource elements to mobile ENG units.

In some embodiments, modulation format and/or forward error correction encoding may be selected for each mobile ENG unit to adapt to different link conditions (e.g., as reported by a remote transceiver of a mobile ENG unit to a base station). For example, quadrature phase-shift keying (QPSK) and rate 1/3 encoding may be used for an OB vehicle link that has poor quality, while 64 or 256 quadrature amplitude modulation (QAM) and 7/8 encoding may be used for an OB vehicle link that has excellent quality. The inventors have recognized and appreciated that the selection of resource blocks and associated modulation and encoding may provide for very fine resolution in the allocation of total capacity to various mobile ENG units. However, it should be appreciated that aspects of the present disclosure are not limited to any particular way of selecting resource blocks, modulation format, and/or encoding parameters.

In some embodiments, an orthogonal frequency-division multiplexing (OFDM) scheme may be used for a downlink from a base station to a mobile ENG unit, while a single-carrier frequency-division multiple access (SC-FDMA)

scheme may be used for an uplink from the mobile ENG unit to the base station. The inventors have recognized and appreciated that this combination may advantageously reduce peak-to-average deviation for the mobile ENG unit. However, it should be appreciated that aspects of the present disclosure are not limited to the use of any particular multiplexing scheme or combination of multiplexing schemes. For example, in some embodiments, an orthogonal frequency-division multiple access (OFDMA) scheme may be used for the uplink.

In some embodiments, one or more modulation schemes may be supported, including, but not limited to, QPSK, 16QAM, 64QAM, and/or BPSK (binary phase-shift keying). In some embodiments, one or more types of channel coding may be supported, including, but not limited to, turbo coding (e.g., rate 1/3), convolution coding (e.g., rate 1/3 tail biting, or rate 1/2), repetition code (e.g., rate 1/3), and/or block code (e.g., rate 1/16). In some embodiments, a combination of multiple coding techniques may be used. For example, a rate 1/9 code may include an inner rate 1/3 turbo code, and an outer rate 1/3 repetition code (so that the turbo-encoded symbols may be repeated three times).

In some embodiments, a low density parity check (LDPC) channel coding may be used, and for each resource block, the use of one or more polarizations may be indicated. However, it should be appreciated that aspects of the present disclosure are not limited to any particular manner of implementation.

FIG. 9 shows a table listing illustrative QoS characteristics per logical sub-channel, in accordance with some embodiments. For example, a communication channel between an ENG unit (e.g., one of the illustrative OB vehicle 110A-B or fixed ENG unit 115 shown in FIG. 1) and a base station (e.g., one of the illustrative base stations 130A-B shown in FIG. 1) may be divided into a plurality of logical sub-channels providing different QoS characteristics as shown in FIG. 9.

In some embodiments, a communication channel may be divided into multiple simultaneous logical sub-channels, each being assigned the same or a different quality control indicator (QCI). Some illustrative QoS characteristics for these sub-channels are shown in FIG. 9. As one example, one or more sub-channels may provide a guaranteed bit rate (GBR), while one or more other sub-channels may not. As another example, traffic may be prioritized according to respective priority levels assigned to the sub-channels. For instance, traffic in sub-channel 5 (e.g., with priority level 1) may be treated preferentially over traffic in sub-channel 1 (e.g., with priority level 2). Another example, each sub-channel may have a maximum packet delay and/or packet error rate as shown in FIG. 9.

The inventors have recognized and appreciated that having logical sub-channels with different QoS characteristics may facilitate optimal usage of available bandwidth. As one example, if a codec having one or more packet loss correction mechanisms (e.g. erasure codes) is used, then a higher packet error loss rate may be tolerated, and a QCI with relatively high packet error loss rate may be used. For instance, a QCI of 3 may be selected for low packet delay (e.g., 50 msec), even though the packet error loss rate may be high (e.g., $10^{-3}$). If, on the other hand, the codec does not have a packet loss correction mechanism, then a QCI with relatively low packet error loss rate may be used. For instance, a QCI of 5 may be selected for low packet error loss rate (e.g., $10^{-6}$), even though the packet delay may be high (e.g., 100 msec). Thus, in some embodiments, the QCI may be selected according to a desired tradeoff between speed and reliability.

As another example, a QCI of 9 may be acceptable for background traffic such as email, even though there is long delay (e.g., 300 msec) and the priority level is the lowest (e.g., 9). In this manner, non-real time communication may be delayed to make room for real time communication when the network is experiencing heavy traffic.

In some embodiments, one or more rules may be used to select an appropriate QCI. For example, one or more portions of a packet header may be examined to determine which QCI should be selected. Examples of information that may be used to select an appropriate QCI include, but are not limited to, IP address sub range, protocol type (e.g. UDP), application type (e.g., RTP), differentiated service code point (DSCP), etc. For instance, a rule may specify that a QCI of 4 is to be used for video originating from a first IP address, while video originating from a second IP address may be mapped to QCI 6, even if both use the same DSCP code, protocol, and application. Such a rule may be used because the first IP address is associated with a camera and the second IP address is associated with a computer (which may have a lesser need to transmit video in real time). It should be appreciated that aspects of the present disclosure are not limited to having 9 logical sub-channels as shown in FIG. 9, as fewer or more logical sub-channels may be created, or no logical sub-channel at all. Furthermore, aspects of the present disclosure are not limited to the use of any particular set of one or more QoS characteristics to characterize the logical sub-channels.

In some embodiments, QoS may be provided using a scheduler at a base station transceiver. The scheduler may be adapted to assign resources based on one or more pieces of information, such as traffic volume, QoS requirements (e.g., GBR, multiple bit rate, QCI, etc.), and/or available maximum bit rate of each mobile ENG unit and associated radio bearer. For example, the scheduler may assign resources based on channel quality (e.g., instantaneous radio-link conditions) at a remote transceiver of a mobile ENG unit, where the channel quality information may be provided by the remote transceiver or by a base station (e.g., a base station implementing an eNodeB).

In some embodiments, a scheduler may take into account buffer status and/or priorities in making scheduling decisions. For example, an uplink scheduler at a base station may associate a service (e.g., voice, video, file transfer, etc.) for a mobile ENG unit with a priority and/or a resource type (e.g., GBR or non-GBR) based on a QCI requested for that service. The uplink scheduler may prioritize traffic taking into account priorities of services for multiple mobile ENG units present in a cell. For example, logical channel groups (LCGs) may be formed based on QCI (e.g., all logical channels having a same QCI may be grouped together), and the scheduler may allocate resources to the highest priority LCG eligible for allocation, then to the next highest priority LCG eligible for allocation, and so on.

In some embodiments, the uplink scheduler may receive a buffer status report (BSR) from a mobile ENG unit, indicating respective buffer sizes of multiple logical channels in an LCG. The uplink schedule may allocate resources to the logical channels within the LCG based on the respective buffer sizes.

In some embodiments, a round robin scheduler may be used that assigns resources cyclically to multiple mobile ENG units based on QCI priority levels (e.g., as shown in the priority column in FIG. 9). For example, the round robin scheduler may begin with services having the highest priority level (e.g., QCI 5 with priority level 1) and loop through the priority levels in descending order. Within each priority level, the round robin scheduler may assign resources to the mobile ENG units according to a certain round robin pattern.

In some embodiments, a maximum throughput scheduler may be used that assigns resources based on QCI priority levels (e.g., as shown in the priority column in FIG.9) and channel quality experienced by the multiple mobile ENG units. For example, the maximum throughput scheduler may begin with services having the highest priority level (e.g., QCI 5 with priority level 1) and loop through the priority levels in descending order. Within each priority level, the maximum throughput scheduler may prioritize mobile ENG units with higher channel quality over those with lower channel quality.

In some embodiments, a proportionately fair scheduler may be used that assigns resources based on QCI priority levels (e.g., as shown in the priority column in FIG.9) and anticipated resource consumption for the multiple mobile ENG units. For example, the proportionately fair scheduler may begin with services having the highest priority level (e.g., QCI 5 with priority level 1) and loop through the priority levels in descending order. Within each priority level, the proportionately fair scheduler may compute an anticipated resource consumption for each mobile ENG unit (e.g., a number of resource element that the mobile ENG unit may need, computed based on channel quality experienced by the mobile ENG unit and the amount of data the mobile ENG unit needs to transmit). The proportionately fair scheduler may then give each data flow a scheduling priority that is inversely proportional to the corresponding anticipated resource consumption.

In some embodiments, multiple scheduling algorithms may be used (e.g., with different algorithms being selected for different subframes or time slots). For example, a maximum throughput scheduler and a round robin scheduler may each be used for half of the resource blocks within a radio frame (e.g., to prevent any mobile ENG unit from being starved).

Figure 10:
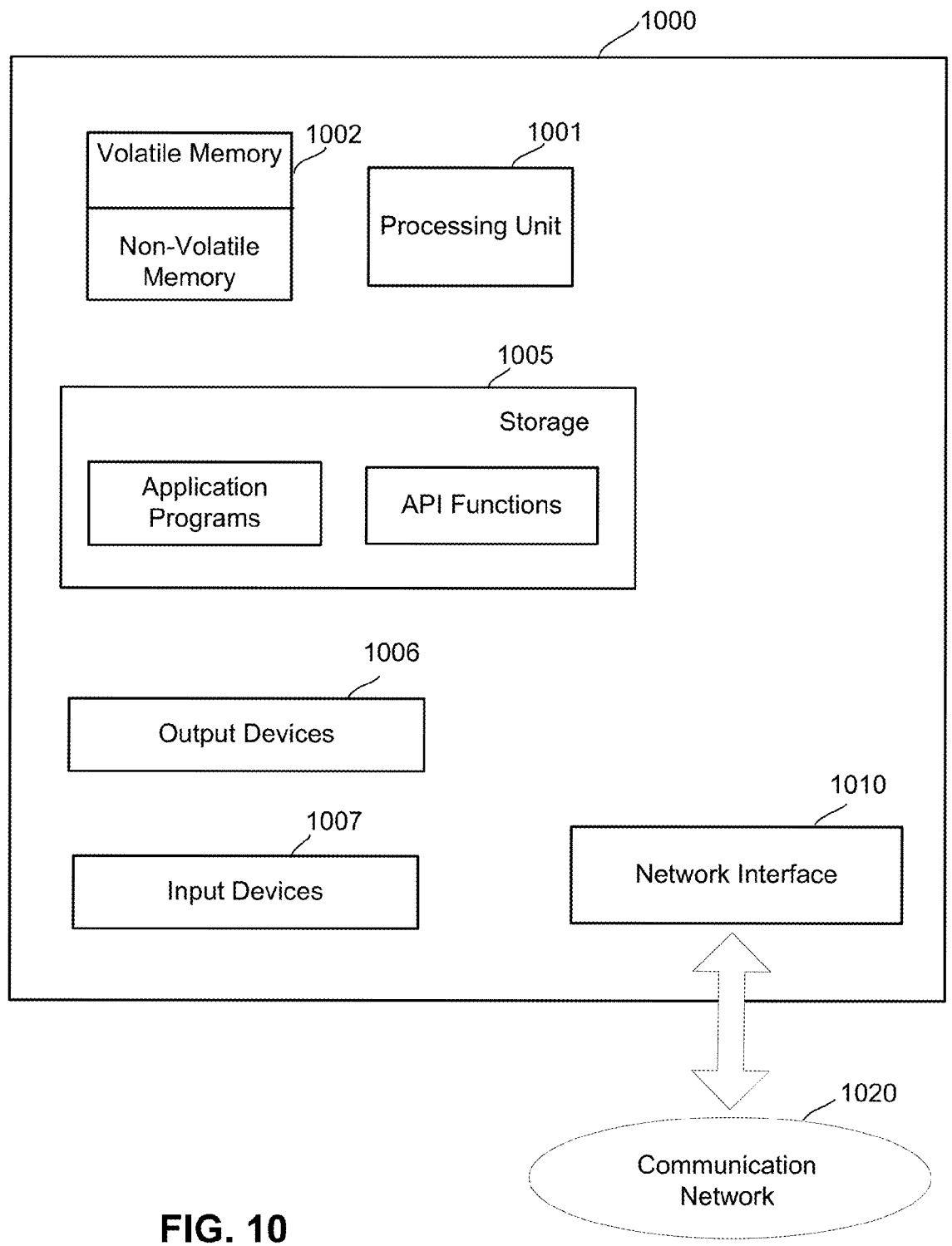
FIG.10 shows, schematically, an illustrative computer 1000 on which any aspect of the present disclosure may be implemented.

FIG.10 shows, schematically, an illustrative computer 1000 on which any aspect of the present disclosure may be implemented. In the embodiment shown in FIG.10, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG.10. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG.10, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer readable medium or media may be transportable, such that the program or programs stored thereon may be loaded onto one or more different computers or other processors to implement various aspects of the present disclosure as discussed above.

The terms "program" or "software" are used herein in a generic sense to refer to any type of computer code or set of computer-executable instructions that may be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Aspects of the present disclosure include the following:

1. A system comprising:
at least one network modem configured to communicate wirelessly with at least one base station,
a subsystem configured to provide data packets to the at least one network modem to be transmitted wirelessly to the at least one base station, the subsystem comprising at least one video encoder configured to receive at least one input video signal and provide at least some of the data packets based on the at least one input video signal, wherein:
the at least one network modem is configured to communicate with the at least one base station using a radio frame comprising a series of subframes which divide the radio frame in time;
the at least one network modem is configured to use one or more first subframes in the series of subframes for a downlink from the at least one base station; and
the at least one network modem is configured to use one or more second subframes in the series of subframes for an uplink to the at least one base station; and a network manager configured to:
monitor usage of the uplink; and
determine, based at least in part on the usage of the uplink, whether to switch at least some of the one or more first subframes from the downlink to the uplink.

2. The system of aspect 1, wherein the network manager is further configured to:
monitor usage of the downlink; and
determine to switch at least some of the one or more first subframes from the downlink to the uplink only if a remainder of the one or more first subframes is sufficient for the usage of the downlink.

3. The system of aspect 1, wherein the network manager is further configured to: cause one of the one or more first subframes to be used as a transition subframe, the transition subframe comprising a guard period between a time slot for the downlink and a time slot for the uplink.

4. The system of aspect 1, wherein the radio frame has a duration of 10 msec.

5. The system of aspect 1, wherein each subframe in the series of subframes has a duration of 1 msec.

6. The system of aspect 1, further comprising the at least one base station, wherein:
the at least one network modem comprises at least a first network modem and a second network modem;
at least one subframe in the series of subframes comprises a plurality of resource elements, each resource element corresponding to a frequency subcarrier and at least one symbol;
the plurality of resource elements comprises a first group of one or more resource elements and a second group of one or more resource elements; and
the at least one base station is configured to allocate the first group of one or more resource elements to the first network modem and the second group of one or more resource elements to the second network modem.

7. The system of aspect 6, wherein the at least one subframe comprises 14 symbols.

8. The system of aspect 6, wherein the frequency subcarrier is 180 kHz wide.

9. The system of aspect 1, further comprising a video camera configured to provide the at least one input video signal to the at least one video encoder.

10. A method comprising acts of:
communicating, via at least one network modem, wirelessly with at least one base station,
providing data packets to the at least one network modem to be transmitted wirelessly to the at least one base station, wherein:
at least some of the data packets are provided by at least one video encoder based on at least one input video signal,
the at least one network modem communicates with the at least one base station using a radio frame comprising a series of subframes which divide the radio frame in time;
the at least one network modem uses one or more first subframes in the series of subframes for a downlink from the at least one base station; and
the at least one network modem uses one or more second subframes in the series of subframes for an uplink to the at least one base station; and
monitoring usage of the uplink; and
determining based at least in part on the usage of the uplink, whether to switch at least some of the one or more first subframes from the downlink to the uplink.

11. The method of aspect 10, further comprising acts of:
monitoring usage of the downlink; and
determining to switch at least some of the one or more first subframes from the downlink to the uplink only if a remainder of the one or more first subframes is sufficient for the usage of the downlink.

12. The method of aspect 10, further comprising:
causing one of the one or more first subframes to be used as a transition subframe, the transition subframe comprising a guard period between a time slot for the downlink and a time slot for the uplink.

13. The method of aspect 10, wherein the radio frame has a duration of 10 msec.

14. The method of aspect 10, wherein each subframe in the series of subframes has a duration of 1 msec.

15. The method of aspect 10, wherein:
the at least one network modem comprises at least a first network modem and a second network modem;
at least one subframe in the series of subframes comprises a plurality of resource elements, each resource element corresponding to a frequency subcarrier and at least one symbol;
the plurality of resource elements comprises a first group of one or more resource elements and a second group of one or more resource elements; and
the method further comprises, allocating the first group of one or more resource elements to the first network modem and the second group of one or more resource elements to the second network modem.

16. The method of aspect 15, wherein the at least one subframe comprises 14 symbols.

17. The method of aspect 15, wherein the frequency subcarrier is 180 kHz wide.

18. The method of aspect 10, wherein the at least one video encoder receives the at least one input video signal from a video camera.

19. At least one computer-readable medium having encoded thereon executable instructions that, when executed by at least one processor, cause the at least one processor to a method comprising acts of:
communicating, via at least one network modem, wirelessly with at least one base station,
providing data packets to the at least one network modem to be transmitted wirelessly to the at least one base station, wherein:
at least some of the data packets are provided by at least one video encoder based on at least one input video signal,
the at least one network modem communicates with the at least one base station using a radio frame comprising a series of subframes which divide the radio frame in time;
the at least one network modem uses one or more first subframes in the series of subframes for a downlink from the at least one base station; and
the at least one network modem uses one or more second subframes in the series of subframes for an uplink to the at least one base station; and
monitoring usage of the uplink; and
determining based at least in part on the usage of the uplink, whether to switch at least some of the one or more first subframes from the downlink to the uplink.

20. The at least one computer-readable medium of aspect 19, wherein the method further comprises:
monitoring usage of the downlink; and
determining to switch at least some of the one or more first subframes from the downlink to the uplink only if a remainder of the one or more first subframes is sufficient for the usage of the downlink.

21. The at least one computer-readable medium of aspect 19, wherein the method further comprises:
causing one of the one or more first subframes to be used as a transition subframe, the transition subframe comprising a guard period between a time slot for the downlink and a time slot for the uplink.

22. The at least one computer-readable medium of aspect 19, wherein the radio frame has a duration of 10 msec.

23. The at least one computer-readable medium of aspect 19, wherein each subframe in the series of subframes has a duration of 1 msec.

24. The at least one computer-readable medium of aspect 19, wherein:
the at least one network modem comprises at least a first network modem and a second network modem;
at least one subframe in the series of subframes comprises a plurality of resource elements, each resource element corresponding to a frequency subcarrier and at least one symbol;
the plurality of resource elements comprises a first group of one or more resource elements and a second group of one or more resource elements; and
the method further comprises, allocating the first group of one or more resource elements to the first network modem and the second group of one or more resource elements to the second network modem.

25. The at least one computer-readable medium of aspect 24, wherein the at least one subframe comprises 14 symbols.

26. The at least one computer-readable medium of aspect 24, wherein the frequency subcarrier is 180 kHz wide.

27. The at least one computer-readable medium of aspect 19, wherein the at least one video encoder receives the at least one input video signal from a video camera.

28. A system comprising:
a plurality of network modems configured to communicate wirelessly with a base station; and
a plurality of subsystems corresponding respectively to the plurality of network modems, each subsystem in the plurality of subsystems being configured to provide data packets to the corresponding network modem to be transmitted wirelessly to the base station, the subsystem comprising at least one video encoder configured to receive at least one input video signal and provide at least some of the data packets based on the at least one input video signal; and
at least one controller configured to assign respective bit rates to at least some subsystems in the plurality of subsystems, wherein the at least one controller is configured to:
determine that a first bit rate assigned to a first subsystem exceeds a first bandwidth available on a wireless link between the base station and the network modem corresponding to the first subsystem; and
in response to determining that the first bit rate assigned to the first subsystem exceeds the first bandwidth, reduce the first bit rate assigned to the first subsystem and increase a second bit rate assigned to a second subsystem.

29. The system of aspect 28, wherein the at least one controller is configured to reduce the first bit rate assigned to the first subsystem to match the first bandwidth available on a wireless link between the base station and the network modem corresponding to the first subsystem.

30. The system of aspect 28, wherein the plurality of subsystems comprises a first subset of subsystems and a second subset of subsystems, and wherein:
the at least one controller is configured to reduce respective bit rates assigned to subsystems in the first subset of subsystems, the first subset of subsystems comprising the first subsystem;

the at least one controller is configured to increase respective bit rates assigned to subsystems in the second subset of subsystems, the second subset of subsystems comprising the second subsystem; and an aggregate amount by which the bit rates of subsystems in the second subset of subsystems are increased matches an aggregate amount by which the bit rates subsystems in the first subset of subsystems are reduced.

31. The system of aspect 30, wherein the at least one controller is configured to determine an initial value for the first bit rate based at least in part on an overall bandwidth for the base station and a ratio between a first measure of input video complexity of the first subsystem and an aggregate measure of input video complexity of the plurality of subsystems.

32. The system of aspect 30, wherein a ratio between a second amount by which the second bit rate is increased and the aggregate amount by which the bit rates of subsystems in the second subset of subsystems are increased matches a ratio between a second measure of input video complexity of the second subsystem and an aggregate measure of input video complexity of the second plurality of subsystems.

33. A method comprising acts of:

communicating, via a plurality of network modems, wirelessly with a base station, wherein the plurality of network modems correspond respectively to a plurality of subsystems; and providing, by each subsystem in the plurality of subsystems, data packets to the corresponding network modem to be transmitted wirelessly to the base station, the subsystem comprising at least one video encoder that receives at least one input video signal and provides at least some of the data packets based on the at least one input video signal; and assigning respective bit rates to at least some subsystems in the plurality of subsystems, comprising:

determining that a first bit rate assigned to a first subsystem exceeds a first bandwidth available on a wireless link between the base station and the network modem corresponding to the first subsystem; and in response to determining that the first bit rate assigned to the first subsystem exceeds the first bandwidth, reducing the first bit rate assigned to the first subsystem and increase a second bit rate assigned to a second subsystem.

34. The method of aspect 33, wherein the first bit rate assigned to the first subsystem is reduced to match the first bandwidth available on a wireless link between the base station and the network modem corresponding to the first subsystem.

35. The method of aspect 33, wherein the plurality of subsystems comprises a first subset of subsystems and a second subset of subsystems, and wherein assigning respective bit rates to at least some subsystems in the plurality of subsystems further comprises:

reducing respective bit rates assigned to subsystems in the first subset of subsystems, the first subset of subsystems comprising the first subsystem; and increasing respective bit rates assigned to subsystems in the second subset of subsystems, the second subset of subsystems comprising the second subsystem; wherein an aggregate amount by which the bit rates of subsystems in the second subset of subsystems are increased matches an aggregate amount by which the bit rates subsystems in the first subset of subsystems are reduced.

36. The method of aspect 35, wherein assigning respective bit rates to at least some subsystems in the plurality of subsystems further comprises:

determining an initial value for the first bit rate based at least in part on an overall bandwidth for the base station and a ratio between a first measure of input video complexity of the first subsystem and an aggregate measure of input video complexity of the plurality of subsystems.

37. The method of aspect 35, wherein a ratio between a second amount by which the second bit rate is increased and the aggregate amount by which the bit rates of subsystems in the second subset of subsystems are increased matches a ratio between a second measure of input video complexity of the second subsystem and an aggregate measure of input video complexity of the second plurality of subsystems.

38. At least one computer-readable medium having encoded thereon executable instructions that, when executed by at least one processor, cause the at least one processor to a method comprising acts of:

communicating, via a plurality of network modems, wirelessly with a base station, wherein the plurality of network modems correspond respectively to a plurality of subsystems; and providing, by each subsystem in the plurality of subsystems, data packets to the corresponding network modem to be transmitted wirelessly to the base station, the subsystem comprising at least one video encoder that receives at least one input video signal and provides at least some of the data packets based on the at least one input video signal; and assigning respective bit rates to at least some subsystems in the plurality of subsystems, comprising:

determining that a first bit rate assigned to a first subsystem exceeds a first bandwidth available on a wireless link between the base station and the network modem corresponding to the first subsystem; and in response to determining that the first bit rate assigned to the first subsystem exceeds the first bandwidth, reducing the first bit rate assigned to the first subsystem and increase a second bit rate assigned to a second subsystem.

39. The at least one computer-readable medium of aspect 38, wherein the first bit rate assigned to the first subsystem is reduced to match the first bandwidth available on a wireless link between the base station and the network modem corresponding to the first subsystem.

40. The at least one computer-readable medium of aspect 38, wherein the plurality of subsystems comprises a first subset of subsystems and a second subset of subsystems, and wherein assigning respective bit rates to at least some subsystems in the plurality of subsystems further comprises:

reducing respective bit rates assigned to subsystems in the first subset of subsystems, the first subset of subsystems comprising the first subsystem; and increasing respective bit rates assigned to subsystems in the second subset of subsystems, the second subset of subsystems comprising the second subsystem; wherein an aggregate amount by which the bit rates of subsystems in the second subset of subsystems are increased matches an aggregate amount by which the bit rates subsystems in the first subset of subsystems are reduced.

41. The at least one computer-readable medium of aspect 40, wherein assigning respective bit rates to at least some subsystems in the plurality of subsystems further comprises:

determining an initial value for the first bit rate based at least in part on an overall bandwidth for the base station and a ratio between a first measure of input video complexity of the first subsystem and an aggregate measure of input video complexity of the plurality of subsystems.

42. The at least one computer-readable medium of aspect 40, wherein a ratio between a second amount by which the second bit rate is increased and the aggregate amount by which the bit rates of subsystems in the second subset of subsystems are increased matches a ratio between a second measure of input video complexity of the second subsystem and an aggregate measure of input video complexity of the second plurality of subsystems.

43. A system comprising:
at least one base station;
at least one network modem configured to communicate wirelessly with the at least one base station; and
a subsystem configured to provide data packets to the at least one network modem to be transmitted wirelessly to the at least one base station, the subsystem comprising at least one video encoder configured to receive at least one input video signal and provide at least some of the data packets based on the at least one input video signal, wherein:
a communication channel between the at least one base station and the at least one network modem is divided into at least a first logical sub-channel and a second logical sub-channel; and
the at least one base station is configured to provide differentiated quality of service (QoS) to the first and second logical sub-channels.

44. The system of aspect 43, wherein the at least one base station is configured to provide different maximum packet delays to the first and second logical sub-channels.

45. The system of aspect 43, wherein the at least one base station is configured to provide different maximum packet error rates to the first and second logical sub-channels.

46. The system of aspect 43, wherein the at least one base station is configured to provide different priority levels to the first and second logical sub-channels.

47. The system of aspect 43, wherein the at least one base station is configured to provide a guaranteed QoS parameter to the first logical sub-channel but not to the second logical sub-channel.

48. The system of aspect 47, wherein the at least one base station is configured to provide a guaranteed bit rate to the first logical sub-channel but not to the second logical sub-channel.

49. The system of aspect 43, further comprising a video camera configured to provide the at least one input video signal to the at least one video encoder.

50. A method comprising acts of:
communicating, via at least one network modem, wirelessly with at least one base station; and
providing data packets to the at least one network modem to be transmitted wirelessly to the at least one base station, wherein:
at least some of the data packets are provided by at least one video encoder based on at least one input video signal;
a communication channel between the at least one base station and the at least one network modem is divided into at least a first logical sub-channel and a second logical sub-channel; and
the at least one base station provides differentiated quality of service (QoS) to the first and second logical sub-channels.

51. The method of aspect 50, wherein the at least one base station provides different maximum packet delays to the first and second logical sub-channels.

52. The method of aspect 50, wherein the at least one base station provides different maximum packet error rates to the first and second logical sub-channels.

53. The method of aspect 50, wherein the at least one base station provides different priority levels to the first and second logical sub-channels.

54. The method of aspect 50, wherein the at least one base station provides a guaranteed QoS parameter to the first logical sub-channel but not to the second logical sub-channel.

55. The method of aspect 54, wherein the at least one base station provides a guaranteed bit rate to the first logical sub-channel but not to the second logical sub-channel.

56. The method of aspect 50, wherein the at least one video encoder receives the at least one input video signal from a video camera.

57. At least one computer-readable medium having encoded thereon executable instructions that, when executed by at least one processor, cause the at least one processor to a method comprising acts of:
communicating, via at least one network modem, wirelessly with at least one base station; and
providing data packets to the at least one network modem to be transmitted wirelessly to the at least one base station, wherein:
at least some of the data packets are provided by at least one video encoder based on at least one input video signal;
a communication channel between the at least one base station and the at least one network modem is divided into at least a first logical sub-channel and a second logical sub-channel; and
the at least one base station provides differentiated quality of service (QoS) to the first and second logical sub-channels.

58. The at least one computer-readable medium of aspect 57, wherein the at least one base station provides different maximum packet delays to the first and second logical sub-channels.

59. The at least one computer-readable medium of aspect 57, wherein the at least one base station provides different maximum packet error rates to the first and second logical sub-channels.

60. The at least one computer-readable medium of aspect 57, wherein the at least one base station provides different priority levels to the first and second logical sub-channels.

61. The at least one computer-readable medium of aspect 57, wherein the at least one base station provides a guaranteed QoS parameter to the first logical sub-channel but not to the second logical sub-channel.

62. The at least one computer-readable medium of aspect 61, wherein the at least one base station provides a guaranteed bit rate to the first logical sub-channel but not to the second logical sub-channel.

63. The at least one computer-readable medium of aspect 57, wherein the at least one video encoder receives the at least one input video signal from a video camera.

64. An electronic news gathering system, comprising:
at least one antenna configured to establish an air link with at least one base station;
a network modem configured to use the at least one antenna to communicate with the at least one base station;
at least one camera configured to output a video signal;
at least one encoder configured to process the video signal output by the at least one camera and generate a first stream of data packets representing the video signal;
a teleprompter configured to display information to a user;
an intercom configured to capture speech from the user and generate a second stream of data packets representing the captured speech; and
a network device configured to:
provide, to the network modem, the first stream of data packets generated by the at least one encoder and the second stream of data packets generated by the intercom, to be transmitted wirelessly to the at least one base station;

receive from the network modem information to be displayed to the user;

provide the information to be displayed to the user to the teleprompter;

receive from the network modem information indicative of at least one network condition; and provide the information indicative of the at least one network condition to the at least one encoder, wherein the at least one encoder is further configured to adjust, based on the information indicative of the at least one network condition, at least one parameter used in generating the first stream of data packets representing the video signal.

65. The system of aspect 64, wherein the information indicative of the at least one network condition is indicative of an air link quality between the at least one antenna and the at least one base station.

66. The system of aspect 64, wherein the information indicative of the at least one network condition is indicative of an amount of network traffic experienced by the at least one base station.

67. The system of aspect 64, further comprising at least one network interface that is different from the network modem, wherein:

the network device is further configured to provide data packets to the at least one network interface for transmission.

68. The system of aspect 67, wherein the network device is configured to provide data packets to the at least one network interface via a bonded connection manager configured to aggregate bandwidth from multiple networks to emulate a single data pipe.

69. The system of aspect 64, wherein the video signal is a first video signal, and wherein the system further comprises:

at least one display configured to visually render a second video signal; and at least one decoder configured to process a third stream of data packets received from the network device and output the second video signal, wherein the network device is further configured to receive the third stream of data packets from the network modem.

70. The system of aspect 64, further comprising a location reporting device configured to provide location information to the at least one encoder, wherein:

the at least one encoder is further configured to tag at least some data packets in the first stream of data packets with the location information.

71. A method comprising acts of:

establishing, via at least one antenna, an air link with at least one base station;

communicating, via a network modem and the at least one antenna, with the at least one base station;

receiving, from at least one camera, a video signal;

causing at least one encoder to process the video signal output by the at least one camera and generate a first stream of data packets representing the video signal;

displaying, via a teleprompter, information to a user;

generating, via an intercom, a second stream of data packets representing speech captured from the user;

providing, to the network modem, the first stream of data packets generated by the at least one encoder and the second stream of data packets generated by the intercom, to be transmitted wirelessly to the at least one base station;

receiving from the network modem information to be displayed to the user;

providing the information to be displayed to the user to the teleprompter;

receiving from the network modem information indicative of at least one network condition; and providing the information indicative of the at least one network condition to the at least one encoder, wherein the at least one encoder adjusts, based on the information indicative of the at least one network condition, at least one parameter used in generating the first stream of data packets representing the video signal.

72. The method of aspect 71, wherein the information indicative of the at least one network condition is indicative of an air link quality between the at least one antenna and the at least one base station.

73. The method of aspect 71, wherein the information indicative of the at least one network condition is indicative of an amount of network traffic experienced by the at least one base station.

74. The method of aspect 71, further comprising an act of:

providing data packets to at least one network interface for transmission, the at least one network interface being different from the network modem.

75. The method of aspect 74, wherein providing data packets to the at least one network interface comprises providing the data packets via a bonded connection manager that aggregates bandwidth from multiple networks to emulate a single data pipe.

76. The method of aspect 71, wherein the video signal is a first video signal, and wherein the method further comprises:

visually rendering, via at least one display, a second video signal; and causing at least one decoder to process a third stream of data packets and output the second video signal, wherein the third stream of data packets is received from the network modem.

77. The method of aspect 71, wherein the at least one encoder tags at least some data packets in the first stream of data packets with location information received from a location reporting device.

78. At least one computer-readable medium having encoded thereon executable instructions that, when executed by at least one processor, cause the at least one processor to a method comprising acts of:

establishing, via at least one antenna, an air link with at least one base station;

communicating, via a network modem and the at least one antenna, with the at least one base station;

receiving, from at least one camera, a video signal;

causing at least one encoder to process the video signal output by the at least one camera and generate a first stream of data packets representing the video signal;

displaying, via a teleprompter, information to a user;

generating, via an intercom, a second stream of data packets representing speech captured from the user;

providing, to the network modem, the first stream of data packets generated by the at least one encoder and the second stream of data packets generated by the intercom, to be transmitted wirelessly to the at least one base station;

receiving from the network modem information to be displayed to the user;

providing the information to be displayed to the user to the teleprompter;

receiving from the network modem information indicative of at least one network condition; and providing the information indicative of the at least one network condition to the at least one encoder, wherein the at least one encoder adjusts, based on the information indicative of the at least one network condition, at least one parameter used in generating the first stream of data packets representing the video signal.

79. The at least one computer-readable medium of aspect 78, wherein the information indicative of the at least one network condition is indicative of an air link quality between the at least one antenna and the at least one base station.

80. The at least one computer-readable medium of aspect 78, wherein the information indicative of the at least one network condition is indicative of an amount of network traffic experienced by the at least one base station.

81. The at least one computer-readable medium of aspect 78, wherein the method further comprises an act of:
providing data packets to at least one network interface for transmission, the at least one network interface being different from the network modem.

82. The at least one computer-readable medium of aspect 81, wherein providing data packets to the at least one network interface comprises providing the data packets via a bonded connection manager that aggregates bandwidth from multiple networks to emulate a single data pipe.

83. The at least one computer-readable medium of aspect 78, wherein the video signal is a first video signal, and wherein the method further comprises:
visually rendering, via at least one display, a second video signal; and
causing at least one decoder to process a third stream of data packets and output the second video signal, wherein the third stream of data packets is received from the network modem.

84. The at least one computer-readable medium of aspect 78, wherein the at least one encoder tags at least some data packets in the first stream of data packets with location information received from a location reporting device.

85. A system comprising:
at least one network modem configured to communicate wirelessly with at least one base station; and
a subsystem configured to provide data packets to the at least one network modem to be transmitted wirelessly to the at least one base station, the subsystem comprising at least one video encoder configured to receive at least one input video signal and provide at least some of the data packets based on the at least one input video signal,
wherein the at least one network modem is further configured to:
engage in an authentication protocol with the subsystem; and
process the data packets received from the subsystem based at least in part on whether the subsystem successfully completes the authentication protocol.

86. The system of aspect 85, wherein the at least one network modem is configured to communicate wirelessly with the at least one base station using at least one communication protocol based on a Long-Term Evolution (LTE) standard.

87. The system of aspect 85, wherein the at least one network modem is configured to communicate wirelessly with the at least one base station using a Broadcast Auxiliary Service (BAS) frequency band.

88. The system of aspect 87, wherein the BAS frequency band comprises a 2 GHz band.

89. The system of aspect 87, wherein the BAS frequency band comprises a 7 GHz band.

90. The system of aspect 85, wherein the at least one network modem is configured to:
in response to the subsystem successfully completing the authentication protocol, transmit the data packets received from the subsystem at a first service level; and
in response to the subsystem failing to complete the authentication protocol, transmit the data packets received from the subsystem at a second service level lower than the first service level.

91. The system of aspect 90, wherein the second service level is a best effort service level.

92. The system of aspect 85, wherein the at least one network modem is configured to:
in response to the subsystem failing to complete the authentication protocol, discard the data packets received from the subsystem.

93. A method comprising acts of:
communicating, by at least one network modem, wirelessly with at least one base station; and
receiving, from a subsystem, data packets to be transmitted wirelessly to the at least one base station, the subsystem comprising at least one video encoder that receives at least one input video signal and provides at least some of the data packets based on the at least one input video signal,
engaging, by the at least one network modem, in an authentication protocol with the subsystem; and
processing, by the at least one network modem, the data packets received from the subsystem based at least in part on whether the subsystem successfully completes the authentication protocol.

94. The method of aspect 93, wherein the at least one network modem communicates wirelessly with the at least one base station using at least one communication protocol based on a Long-Term Evolution (LTE) standard.

95. The method of aspect 93, wherein the at least one network modem communicates wirelessly with the at least one base station using a Broadcast Auxiliary Service (BAS) frequency band.

96. The method of aspect 95, wherein the BAS frequency band comprises a 2 GHz band.

97. The method of aspect 95, wherein the BAS frequency band comprises a 7 GHz band.

98. The method of aspect 93, further comprising:
in response to the subsystem successfully completing the authentication protocol, transmitting, by the at least one network modem, the data packets received from the subsystem at a first service level; and
in response to the subsystem failing to complete the authentication protocol, transmitting, by the at least one network modem, the data packets received from the subsystem at a second service level lower than the first service level.

99. The method of aspect 98, wherein the second service level is a best effort service level.

100. The method of aspect 93, further comprising:
in response to the subsystem failing to complete the authentication protocol, discarding, by the at least one network modem, the data packets received from the subsystem.

101. At least one computer-readable medium having encoded thereon executable instructions that, when executed by at least one processor, cause the at least one processor to a method comprising acts of:
communicating, by at least one network modem, wirelessly with at least one base station; and
receiving, from a subsystem, data packets to be transmitted wirelessly to the at least one base station, the subsystem comprising at least one video encoder that receives at least one input video signal and provides at least some of the data packets based on the at least one input video signal, engaging, by the at least one network modem, in an authentication protocol with the subsystem; and processing, by the at least one network modem, the data packets received from the subsystem based at least in part on whether the subsystem successfully completes the authentication protocol.

102. The at least one computer-readable medium of aspect 101, wherein the at least one network modem communicates wirelessly with the at least one base station using at least one communication protocol based on a Long-Term Evolution (LTE) standard.

103. The at least one computer-readable medium of aspect 101, wherein the at least one network modem communicates wirelessly with the at least one base station using a Broadcast Auxiliary Service (BAS) frequency band.

104. The at least one computer-readable medium of aspect 103, wherein the BAS frequency band comprises a 2 GHz band.

105. The at least one computer-readable medium of aspect 103, wherein the BAS frequency band comprises a 7 GHz band.

106. The at least one computer-readable medium of aspect 101, wherein the method further comprises:

in response to the subsystem successfully completing the authentication protocol, transmitting, by the at least one network modem, the data packets received from the subsystem at a first service level; and in response to the subsystem failing to complete the authentication protocol, transmitting, by the at least one network modem, the data packets received from the subsystem at a second service level lower than the first service level.

107. The at least one computer-readable medium of aspect 106, wherein the second service level is a best effort service level.

108. The at least one computer-readable medium of aspect 101, wherein the method further comprises:

in response to the subsystem failing to complete the authentication protocol, discarding, by the at least one network modem, the data packets received from the subsystem.

109. A system comprising:

at least one network modem configured to communicate wirelessly with at least one base station; and a subsystem configured to provide data packets to the at least one network modem to be transmitted wirelessly to the at least one base station, the subsystem comprising at least one video encoder configured to receive at least one input video signal and provide at least some of the data packets based on the at least one input video signal, wherein:

the at least one network modem is further configured to provide network condition information to the subsystem; and the subsystem is further configured to adjust at least one operating parameter of the at least one video encoder based at least in part on the network condition information received from the at least one network modem.

110. The system of aspect 109, wherein the at least one network modem is configured to communicate wirelessly with the at least one base station using at least one communication protocol based on a Long-Term Evolution (LTE) standard.

111. The system of aspect 109, wherein the at least one network modem is configured to communicate wirelessly with the at least one base station using a Broadcast Auxiliary Service (BAS) frequency band.

112. The system of aspect 111, wherein the BAS frequency band comprises a 2 GHz band.

113. The system of aspect 111, wherein the BAS frequency band comprises a 7 GHz band.

114. The system of aspect 109, wherein the network condition information comprises a maximum data rate (MDR).

115. The system of aspect 109, wherein the network condition information comprises a current data rate (CDR).

116. The system of aspect 109, wherein the at least one network modem is further configured to provide network condition information to the subsystem at least once every two seconds.

117. The system of aspect 109, wherein the at least one network modem is further configured to provide network condition information to the subsystem at least once every second.

118. The system of aspect 109, wherein the at least one operating parameter that the subsystem is configured to adjust based at least in part on the network condition information comprises a bit rate of the at least one video encoder.

119. The system of aspect 118, wherein:

the network condition information comprises at least one link quality measure for a wireless link between the at least one network modem and the at least one base station;

the at least one operating parameter that the subsystem is configured to adjust based at least in part on the network condition information further comprises at least one forward error correction parameter; and the subsystem is configured to adjust the at least one forward error correction parameter based at least in part on the at least one link quality measure.

120. The system of aspect 119, wherein the at least one forward error correction parameter comprises a number of rows and/or a number of columns for forward error correction.

121. The system of aspect 119, wherein the at least one link quality measure comprises a relative link quality (RLQ).

122. The system of aspect 119, wherein:

the network condition information further comprises a current data rate (CDR); and the subsystem is configured to adjust the bit rate of the at least one video encoder based at least in part on the CDR and the at least one forward error correction parameter.

123. A method comprising acts of:

communicating, via at least one network modem, wirelessly with at least one base station;

providing data packets to the at least one network modem to be transmitted wirelessly to the at least one base station, wherein at least some of the data packets are provided by at least one video encoder based on at least one input video signal;

receiving, from the at least one network modem, network condition information; and adjusting at least one operating parameter of the at least one video encoder based at least in part on the network condition information received from the at least one network modem.

124. The method of aspect 123, wherein the at least one network modem communicates wirelessly with the at least one base station using at least one communication protocol based on a Long-Term Evolution (LTE) standard.

125. The method of aspect 123, wherein the at least one network modem communicates wirelessly with the at least one base station using a Broadcast Auxiliary Service (BAS) frequency band.

126. The method of aspect 125, wherein the BAS frequency band comprises a 2 GHz band.

127. The method of aspect 125, wherein the BAS frequency band comprises a 7 GHz band.

128. The method of aspect 123, wherein the network condition information comprises a maximum data rate (MDR).

129. The method of aspect 123, wherein the network condition information comprises a current data rate (CDR).

130. The method of aspect 123, wherein the at least one network modem is further configured to provide network condition information at least once every two seconds.

131. The method of aspect 123, wherein the network condition information is received from the at least one network modem at least once every second.

132. The method of aspect 123, wherein the at least one operating parameter that is adjusted based at least in part on the network condition information comprises a bit rate of the at least one video encoder.

133. The method of aspect 132, wherein:
the network condition information comprises at least one link quality measure for a wireless link between the at least one network modem and the at least one base station;
the at least one operating parameter that is adjusted based at least in part on the network condition information further comprises at least one forward error correction parameter; and
the method further comprises adjusting the at least one forward error correction parameter based at least in part on the at least one link quality measure.

134. The method of aspect 133, wherein the at least one forward error correction parameter comprises a number of rows and/or a number of columns for forward error correction.

135. The method of aspect 133, wherein the at least one link quality measure comprises a relative link quality (RLQ).

136. The method of aspect 133, wherein:
the network condition information further comprises a current data rate (CDR); and
the bit rate of the at least one video encoder is adjusted based at least in part on the CDR and the at least one forward error correction parameter.

137. At least one computer-readable medium having encoded thereon executable instructions that, when executed by at least one processor, cause the at least one processor to a method comprising acts of:
communicating, via at least one network modem, wirelessly with at least one base station;
providing data packets to the at least one network modem to be transmitted wirelessly to the at least one base station, wherein at least some of the data packets are provided by at least one video encoder based on at least one input video signal;
receiving, from the at least one network modem, network condition information; and
adjusting at least one operating parameter of the at least one video encoder based at least in part on the network condition information received from the at least one network modem.

138. The at least one computer-readable medium of aspect 137, wherein the at least one network modem communicates wirelessly with the at least one base station using at least one communication protocol based on a Long-Term Evolution (LTE) standard.

139. The at least one computer-readable medium of aspect 137, wherein the at least one network modem communicates wirelessly with the at least one base station using a Broadcast Auxiliary Service (BAS) frequency band.

140. The at least one computer-readable medium of aspect 139, wherein the BAS frequency band comprises a 2 GHz band.

141. The at least one computer-readable medium of aspect 139, wherein the BAS frequency band comprises a 7 GHz band.

142. The at least one computer-readable medium of aspect 137, wherein the network condition information comprises a maximum data rate (MDR).

143. The at least one computer-readable medium of aspect 137, wherein the network condition information comprises a current data rate (CDR).

144. The at least one computer-readable medium of aspect 137, wherein the at least one network modem is further configured to provide network condition information at least once every two seconds.

145. The at least one computer-readable medium of aspect 137, wherein the network condition information is received from the at least one network modem at least once every second.

146. The at least one computer-readable medium of aspect 137, wherein the at least one operating parameter that is adjusted based at least in part on the network condition information comprises a bit rate of the at least one video encoder.

147. The at least one computer-readable medium of aspect 146, wherein:
the network condition information comprises at least one link quality measure for a wireless link between the at least one network modem and the at least one base station;
the at least one operating parameter that is adjusted based at least in part on the network condition information further comprises at least one forward error correction parameter; and
the method further comprises adjusting the at least one forward error correction parameter based at least in part on the at least one link quality measure.

148. The at least one computer-readable medium of aspect 147, wherein the at least one forward error correction parameter comprises a number of rows and/or a number of columns for forward error correction.

149. The at least one computer-readable medium of aspect 147, wherein the at least one link quality measure comprises a relative link quality (RLQ).

150. The at least one computer-readable medium of aspect 147, wherein:
the network condition information further comprises a current data rate (CDR); and
the bit rate of the at least one video encoder is adjusted based at least in part on the CDR and the at least one forward error correction parameter.

What is claimed is:

1. A system comprising:
at least one network modem configured to communicate wirelessly with at least one base station; and
a subsystem configured to provide data packets to the at least one network modem to be transmitted wirelessly to the at least one base station, the subsystem comprising at least one first video encoder of a plurality of video encoders in an Electronic News Gathering (ENG)

network, the at least one first video encoder being configured to receive at least one input video signal and provide at least some of the data packets based on the at least one input video signal, wherein:

the at least one network modem is further configured to:
receive, via the at least one base station, from a controller configured to allocate bandwidth among the plurality of video encoders in the ENG network, a bit rate assigned to the at least one first video encoder, wherein the bit rate is assigned based at least in part on:
a radio frequency (RF) link quality between the at least one network modem and the at least one base station;
at least one first value indicative of video complexity at the at least one first video encoder; and
at least one second value indicative of video complexity at at least one second video encoder of the plurality of video encoders in the ENG network; and
provide network condition information to the subsystem, wherein the network condition information comprises the bit rate assigned to the at least one first encoder by the controller configured to allocate bandwidth among the plurality of video encoders in the ENG network; and
the subsystem is further configured to adjust at least one operating parameter of the at least one video encoder based at least in part on the network condition information received from the at least one network modem.

2. The system of claim 1, wherein the at least one network modem is configured to communicate wirelessly with the at least one base station using at least one communication protocol based on a Long-Term Evolution (LTE) standard.

3. The system of claim 1, wherein the at least one network modem is configured to communicate wirelessly with the at least one base station using a Broadcast Auxiliary Service (BAS) frequency band.

4. The system of claim 3, wherein the BAS frequency band comprises a 2 GHz band.

5. The system of claim 3, wherein the BAS frequency band comprises a 7 GHz band.

6. The system of claim 1, wherein the network condition information comprises a maximum data rate (MDR).

7. The system of claim 1, wherein the network condition information comprises a current data rate (CDR).

8. The system of claim 1, wherein the at least one network modem is further configured to provide network condition information to the subsystem at least once every two seconds.

9. The system of claim 1, wherein the at least one network modem is further configured to provide network condition information to the subsystem at least once every second.

10. The system of claim 1, wherein the at least one operating parameter that the subsystem is configured to adjust based at least in part on the network condition information comprises a bit rate of the at least one video encoder.

11. The system of claim 10, wherein:
the network condition information comprises at least one link quality measure for a wireless link between the at least one network modem and the at least one base station;
the at least one operating parameter that the subsystem is configured to adjust based at least in part on the network condition information further comprises at least one forward error correction parameter; and
the subsystem is configured to adjust the at least one forward error correction parameter based at least in part on the at least one link quality measure.

12. The system of claim 11, wherein the at least one forward error correction parameter comprises a number of rows and/or a number of columns for forward error correction.

13. The system of claim 11, wherein the at least one link quality measure comprises a relative link quality (RLQ).

14. The system of claim 11, wherein:
the network condition information further comprises a current data rate (CDR); and
the subsystem is configured to adjust the bit rate of the at least one video encoder based at least in part on the CDR and the at least one forward error correction parameter.

15. A method comprising acts of:
communicating, via at least one network modem, wirelessly with at least one base station;
providing data packets to the at least one network modem to be transmitted wirelessly to the at least one base station, wherein at least some of the data packets are provided by at least one first video encoder of a plurality of video encoders in an Electronic News Gathering (ENG) network, the at least one first video encoder being configured to receive at least one input video signal and provide at least some of the data packets based on at least one input video signal;
receiving, from the at least one network modem, network condition information, the network condition information comprising a bit rate received by the at least one network modem via the at least one base station, the bit rate being assigned to the at least one first video encoder by a controller configured to allocate bandwidth among the plurality of video encoders in the ENG network, wherein the bit rate is assigned based at least in part on:
a radio frequency (RF) link quality between the at least one network modem and the at least one base station;
at least one first value indicative of video complexity at the at least one first video encoder; and
at least one second value indicative of video complexity at at least one second video encoder of the plurality of video encoders in the ENG network; and
adjusting at least one operating parameter of the at least one video encoder based at least in part on the network condition information received from the at least one network modem.

16. The method of claim 15, wherein the at least one network modem communicates wirelessly with the at least one base station using at least one communication protocol based on a Long-Term Evolution (LTE) standard.

17. The method of claim 15, wherein the at least one network modem communicates wirelessly with the at least one base station using a Broadcast Auxiliary Service (BAS) frequency band.

18. The method of claim 17, wherein the BAS frequency band comprises a 2 GHz band.

19. The method of claim 17, wherein the BAS frequency band comprises a 7 GHz band.

20. The method of claim 15, wherein the network condition information comprises a maximum data rate (MDR).

21. The method of claim 15, wherein the network condition information comprises a current data rate (CDR).

22. The method of claim 15, wherein the at least one network modem is further configured to provide network condition information at least once every two seconds.

23. The method of claim 15, wherein the network condition information is received from the at least one network modem at least once every second.

24. The method of claim 15, wherein the at least one operating parameter that is adjusted based at least in part on the network condition information comprises a bit rate of the at least one video encoder.

25. The method of claim 24, wherein:
the network condition information comprises at least one link quality measure for a wireless link between the at least one network modem and the at least one base station;
the at least one operating parameter that is adjusted based at least in part on the network condition information further comprises at least one forward error correction parameter; and
the method further comprises adjusting the at least one forward error correction parameter based at least in part on the at least one link quality measure.

26. The method of claim 25, wherein the at least one forward error correction parameter comprises a number of rows and/or a number of columns for forward error correction.

27. The method of claim 25, wherein the at least one link quality measure comprises a relative link quality (RLQ).

28. The method of claim 25, wherein:
the network condition information further comprises a current data rate (CDR); and
the bit rate of the at least one video encoder is adjusted based at least in part on the CDR and the at least one forward error correction parameter.

29. At least one non-transitory computer-readable medium having encoded thereon executable instructions that, when executed by at least one processor, cause the at least one processor to perform a method comprising acts of:
communicating, via at least one network modem, wirelessly with at least one base station;
providing data packets to the at least one network modem to be transmitted wirelessly to the at least one base station, wherein at least some of the data packets are provided by at least one first video encoder of a plurality of video encoders in an Electronic News Gathering (ENG) network, the at least one first video encoder being configured to receive at least one input video signal and provide at least some of the data packets based on at least one input video signal;
receiving, from the at least one network modem, network condition information, the network condition information comprising a bit rate received by the at least one network modem via the at least one base station, the bit rate being assigned to the at least one first video encoder by a controller configured to allocate bandwidth among the plurality of video encoders in the ENG network, wherein the bit rate is assigned based at least in part on:
a radio frequency (RF) link quality between the at least one network modem and the at least one base station;
at least one first value indicative of video complexity at the at least one first video encoder; and
at least one second value indicative of video complexity at at least one second video encoder of the plurality of video encoders in the ENG network; and
adjusting at least one operating parameter of the at least one video encoder based at least in part on the network condition information received from the at least one network modem.

30. The at least one non-transitory computer-readable medium of claim 29, wherein the at least one network modem communicates wirelessly with the at least one base station using at least one communication protocol based on a Long-Term Evolution (LTE) standard.

* * * * *